United States Patent
Kim et al.

(10) Patent No.: US 9,554,341 B2
(45) Date of Patent: Jan. 24, 2017

(54) METHOD AND DEVICE FOR ALLOCATING UPLINK POWER IN MULTIPLE TA ENVIRONMENTS

(71) Applicant: Pantech Co., Ltd., Seoul (KR)

(72) Inventors: Jong Nam Kim, Seoul (KR); Jianjun Li, Seoul (KR)

(73) Assignee: Pantech Inc., Seoul (KR)

( * ) Notice: Subject to any disclaimer, the term of this patent is extended or adjusted under 35 U.S.C. 154(b) by 266 days.

(21) Appl. No.: 14/374,604

(22) PCT Filed: Jan. 17, 2013

(86) PCT No.: PCT/KR2013/000377
§ 371 (c)(1),
(2) Date: Jul. 25, 2014

(87) PCT Pub. No.: WO2013/115510
PCT Pub. Date: Aug. 8, 2013

(65) Prior Publication Data
US 2015/0036605 A1    Feb. 5, 2015

(30) Foreign Application Priority Data
Jan. 30, 2012  (KR) ........................ 10-2012-0009262

(51) Int. Cl.
*H04W 52/30*  (2009.01)
*H04W 52/14*  (2009.01)
(Continued)

(52) U.S. Cl.
CPC ............. *H04W 52/30* (2013.01); *H04W 24/08* (2013.01); *H04W 52/146* (2013.01);
(Continued)

(58) Field of Classification Search
CPC .... H04W 52/00; H04W 52/146; H04W 52/16; H04W 52/30; H04W 52/34
See application file for complete search history.

(56) References Cited

U.S. PATENT DOCUMENTS

2012/0218882 A1    8/2012  Ko et al.
2013/0044831 A1*   2/2013  Narasimha .......... H04W 52/365
                                                          375/260
(Continued)

FOREIGN PATENT DOCUMENTS

| KR | 10-2011-0051156 | 5/2011 |
| KR | 10-2011-0137446 | 12/2011 |
| KR | 10-2011-0137983 | 12/2011 |

OTHER PUBLICATIONS

International Search Report dated May 31, 2013 in International Patent Application No. PCT/KR2013/000377.

*Primary Examiner* — Scott M Sciacca
(74) *Attorney, Agent, or Firm* — H.C. Park & Associates, PLC

(57) ABSTRACT

The present specification relates to a method and device for allocating uplink power in multiple-TA environments. The method comprises: calculating transmission powers of a PUSCH for subframe m of a first component carrier and subframes k and (k+1) of a second component carrier by using required powers of the PUSCH for the first half and second half of subframe m, which temporally overlaps with the second half of subframe k and the first half of subframe (k+1), available powers of the PUSCH for the first and second components carriers, and required powers of the PUSCH for the second half of subframe K and the first half of subframe (k+1) in a user equipment to which multiple TAs are applied; and setting the transmission power of the PUSCH for subframe m according to the calculated trans- (Continued)

mission powers and performing uplink transmission to a base station through the subframe m.

20 Claims, 13 Drawing Sheets

(51) Int. Cl.
  *H04W 52/22* (2009.01)
  *H04W 52/36* (2009.01)
  *H04W 24/08* (2009.01)
  *H04W 52/16* (2009.01)
  *H04W 52/34* (2009.01)

(52) U.S. Cl.
  CPC ......... *H04W 52/16* (2013.01); *H04W 52/228* (2013.01); *H04W 52/367* (2013.01); *H04W 52/34* (2013.01)

(56) References Cited

U.S. PATENT DOCUMENTS

| | | | |
|---|---|---|---|
| 2013/0058315 A1* | 3/2013 | Feuersanger | H04W 52/281 370/336 |
| 2013/0064131 A1 | 3/2013 | Kwon et al. | |
| 2013/0070716 A1 | 3/2013 | Kwon et al. | |
| 2013/0114505 A1* | 5/2013 | Haim | H04W 52/146 370/328 |
| 2014/0050205 A1* | 2/2014 | Ahn | H04W 52/146 370/336 |

\* cited by examiner

FIG. 7
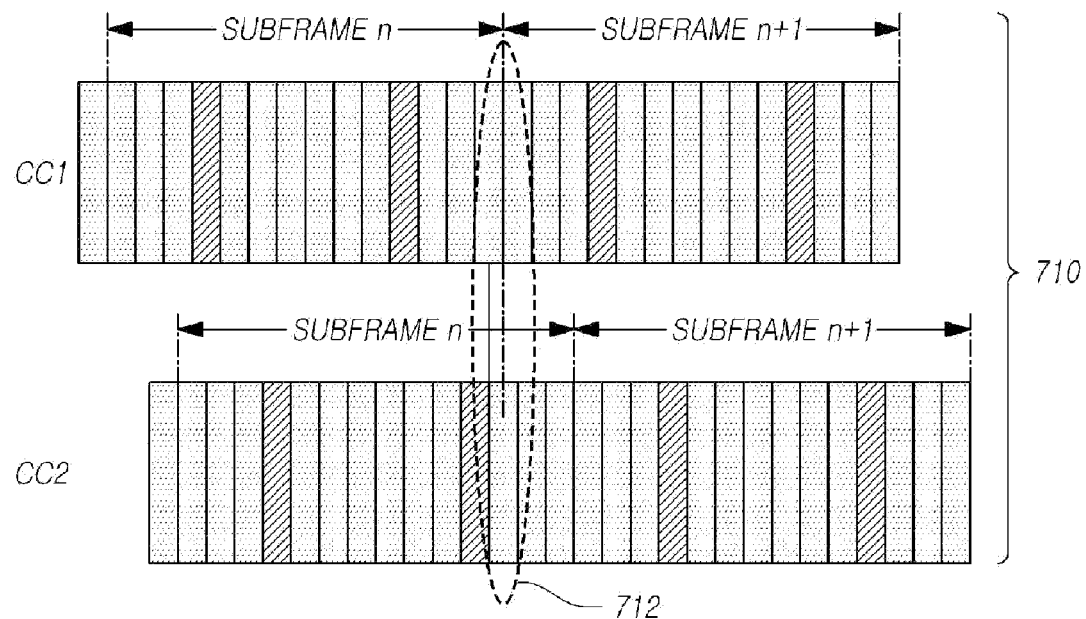
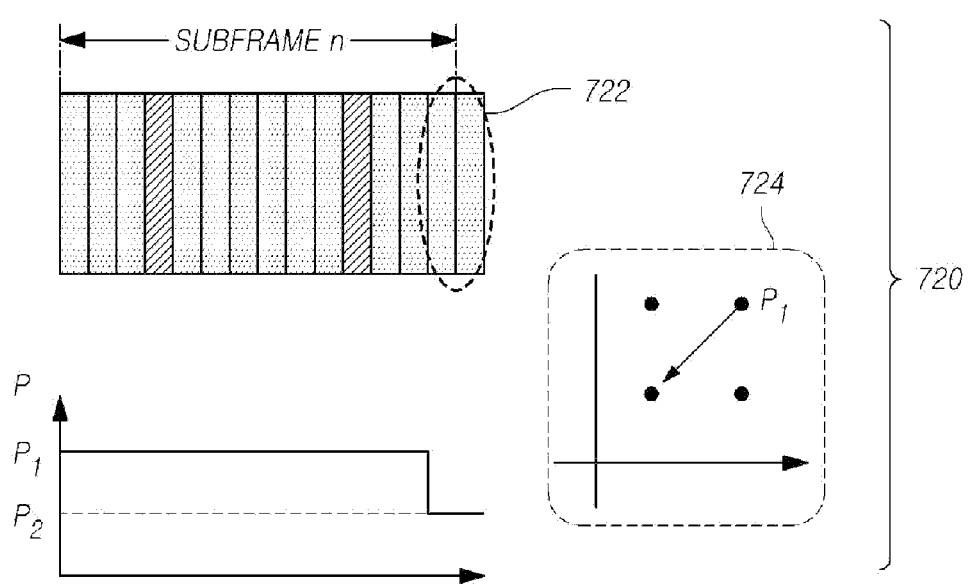

METHOD AND DEVICE FOR ALLOCATING UPLINK POWER IN MULTIPLE TA ENVIRONMENTS

CROSS-REFERENCE TO RELATED APPLICATIONS

This application is the National Stage Entry of International Application PCT/KR2013/000377, filed on Jan. 17, 2013, and claims priority from and the benefit of Korean Patent Application No. 10-2012-0009262, filed on Jan. 30, 2012, each of which is hereby incorporated by reference for all purposes as if fully set forth herein.

BACKGROUND

Field

The present invention relates to a method and apparatus for allocating uplink power in a condition where simultaneous transmission of PUSCH (Physical Uplink Shared CHannel) and PUSCH/PUCCH (Physical Uplink Control CHannel) is allowed in multiple component carriers, when a user equipment is set to transmit an uplink to multiple component carriers.

Particularly, in the multiple-TA (multiple Timing Advance) condition, PUSCH transmission may be in a subframe of another component carrier. The present invention provides a method of allocating power for simultaneous inter-channel transmission in the multiple-TA condition.

Discussion of the Background

In a communication system, a user equipment controls transmission power of a physical channel and a signal so that different uplink physical channels and signals may be received by a base station (cell) with appropriate power.

The uplink power control may include an open-loop scheme in which the transmission power of a user equipment varies based on a downlink path loss, and a closed-loop scheme in which a network directly controls the transmission power of a user equipment through an explicit power control command transmitted to a downlink.

The uplink power may be limited by maximum power that a user equipment may output. The user equipment controls the power of a physical channel and a signal in the limited available power.

SUMMARY

Therefore, the present invention has been made in view of the above-mentioned problems, and an aspect of the present invention is to provide a method of allocating transmission power when a plurality of uplink physical channels and an uplink reference signal are simultaneously transmitted Particularly, in a multiple-TA (multiple Timing Advance) condition, PUSCH transmission may be in a subframe of another component carrier. The present invention is to solve the problem of power allocation for simultaneous inter-channel transmission in the multiple-TA condition.

In accordance with an aspect of the present invention, there is provided a method of allocating uplink power in a multiple-TA (Multiple Timing Advanced) environment, from a perspective of a user equipment that applies a multiple-TA in a multiple-component carrier system, including a first component carrier and a second component carrier, the method including: calculating PUSCH (Physical Uplink Shared Channel) transmission power of a subframe m, a subframe k, and a subframe (k+1), based on required power of a PUSCH of the former half and the latter half of the subframe m of the first component carrier, which respectively overlap, in time, the latter half of the subframe k and the former half of the subframe (k+1) of the second component carrier, PUSCH available power with respect to the component carriers, and PUSCH required power of the latter half of the subframe k and the former half of the subframe (k+1); and setting the PUSCH transmission power of the subframe m, based on the calculated power, and executing uplink transmission to a base station through the subframe m.

In accordance with an aspect of the present invention, there is provided a user equipment that applies a multiple-TA (Multiple Timing Advanced) in a multiple-component carrier system including a first component carrier and a second component carrier, the user equipment including: a power calculating unit that calculates PUSCH (Physical Uplink Shared Channel) transmission power of a subframe m, a subframe k, and a subframe (k+1), based on required power of a PUSCH of the former half and the latter half of the subframe m of the first component carrier, which respectively overlap, in time, the latter half of the subframe k and the former half of the subframe (k+1) of the second component carrier, PUSCH available power with respect to the component carriers, and PUSCH required power of the latter half of the subframe k and the former half of the subframe (k+1); and a transceiving unit that sets the PUSCH transmission power of the subframe m, based on the calculated power, and executes uplink transmission to a base station through the subframe m.

BRIEF DESCRIPTION OF THE DRAWINGS

FIG. 7 is a diagram illustrating an example of error detection, which is caused by power scaling when two symbols of another component carrier consecutively exist in a single symbol section of a component carrier in a multiple-TA environment where a third embodiment of the present invention is applicable;

DETAILED DESCRIPTION OF THE ILLUSTRATED EMBODIMENTS

Figure 1:
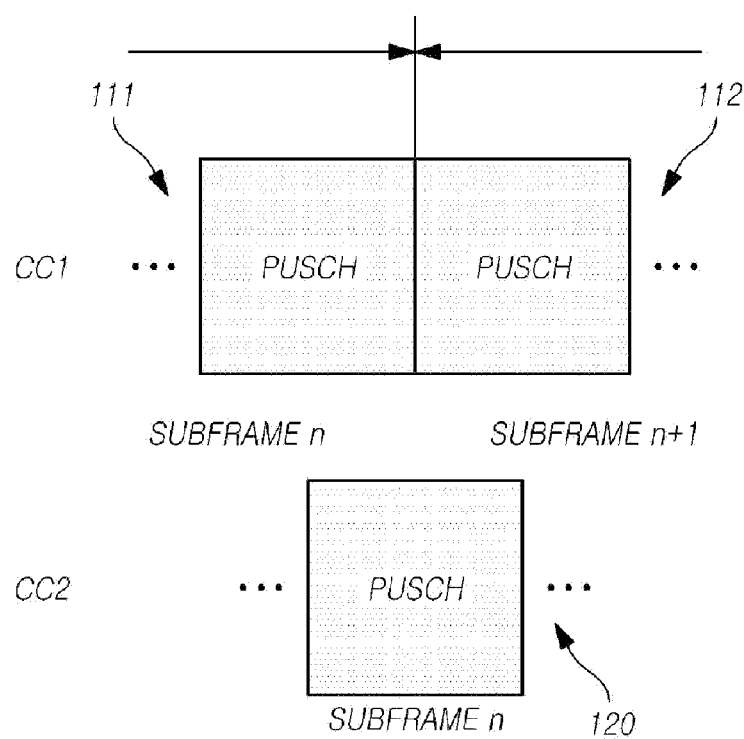
FIG. 1 is a diagram illustrating simultaneous PUSCH transmission in a multiple-TA (multiple Timing Advance) environment according to an embodiment of the present invention.

Hereinafter, embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

The wireless communication system may include a User Equipment (UE) and a Base Station (BS or eNB). Throughout the specifications, the user equipment may be an inclusive concept indicating a user terminal utilized in wireless communication, including a UE (User Equipment) in WCDMA, LTE, HSPA, and the like, and an MS (Mobile station), a UT (User Terminal), an SS (Subscriber Station), a wireless device, and the like in GSM.

The base station or a cell, may generally refer to a station where communication with the user equipment is performed, and may also be referred to as a Node-B, an eNB (evolved Node-B), a Sector, a Site, a BTS (Base Transceiver System), an Access Point, a Relay Node, and the like.

That is, the base station or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

In the specifications, the user equipment 10 and the base station are used as two inclusive transceiving subjects to embody the technology and technical concepts described in the specifications, and may not be limited to a predetermined term or word.

In a system, such as LTE and LTE-A, to which the present invention may be applied, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), and the like, and may be configured as a data channel, such as a PDSCH (Physical Downlink Shared CHannel), a PUSCH (Physical Uplink Shared CHannel), and the like, so as to transmit data.

The process of determining PUSCH transmission power in a service cell c may be based on whether a PUCCH is transmitted at the same time as a PUSCH, as shown in Equation 1.

[Equation 1]

When $PUCCH$ is not transmitted simultaneously (without simultaneous $PUCCH$)

$$P_{PUSCH,c}(i) = \min \begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}$$

When $PUCCH$ is transmitted simultaneously (with simultaneous $PUCCH$)

$$P_{PUSCH,c}(i) = \min \begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}$$

$i$: subframe index, $P_{CMAX,c}(i)$: configured $UE$ transmit power, $\hat{P}_{CMAX,c}(i)$: linear value of $P_{CMAX,c}(i)$ $P_{PUCCH}(i)$: $PUCCH$ transmit power, $\hat{P}_{PUCCH}(i)$: linear value of $P_{PUCCH}(i)$ $M_{PUSCH,c}(i)$: $PUSCH$ transmission band based on Resource Block ($RB$) unit $P_{O\_PUSCH,c}(j)$: semi-static base level.

formed of common power level $P_{O\_NOMINAL\_PUSCH,c}(j)$ and $UE$-specific power level $P_{O\_UE\_PUSCH,c}(j)$ $P_{O\_PUSCH,c}(j) = P_{O\_NOMINAL\_PUSCH,c}(j) + P_{O\_UE\_PUSCH,c}(j)$, $j = 0$ indicates $SPS$ allocation, $j = 1$ indicates dynamic allocation, and $j = 2$ indicates $randomn$ access response $\alpha_c$: pathloss compensation $\alpha_c \in \{0, 0.4, 0.5, 0.6, 0.7, 0.8, 0.9, 1\}$, 3-bit parameter $PL_c$: path-loss, $\Delta_{TF\_c}(i)$: $MCS$ dependent parameter $f_c(i) = f_c(i-1) + \delta_{PUSCH,c}(i - K_{PUSCH})$ for accumulation-enable $f_c(i) = \delta_{PUSCH,c}(i - K_{PUSCH})$ for accumulation not enable, $\delta_{PUSCH,c}$: correction value PUCCH transmission power in the serving cell C may be determined as shown in Equation 2.

[Equation 2]

$$P_{PUCCH}(i) = \min \begin{Bmatrix} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{Bmatrix}$$

$P_{O\_PUCCH} = P_{O\_NOMINAL\_PUCCH} + P_{O\_UE\_PUCCH}$ $\Delta_{F\_PUCCH}(F), \Delta_{TxD}(F')$: parameter transferred from higher layer, being affected by $PUCCH$ format $(F)$ $h(n_{CQI}, n_{HARQ}, n_{SR})$: $PUCCH$ format dependent value $n_{CQI}$: number of $CQI$ information bits, $n_{SR}$: number of $SR$ bits.

$n_{HARQ}$: number of $HARQ$ bits

Value based on each format is as follows.

For $PUCCH$ format 1, 1a and 1b  $h(n_{CQI}, n_{HARQ}, n_{SR}) = 0$

For $PUCCH$ format 1b with channel selection,

-continued

When one or more serving cells are set for $UE$, $$h(n_{CQI}, n_{HARQ}, n_{SR}) = \frac{(n_{HARQ} - 1)}{2},$$

For the rest, $h(n_{CQI}, n_{HARQ}, n_{SR}) = 0$

For $PUCCH$ format 2, 2a, 2b and normal cyclic prefix $h(n_{CQI}, n_{HARQ}, n_{SR}) =$ $$\begin{cases} 10\log_{10}\left(\frac{n_{CQI}}{4}\right) & \text{if } n_{CQI} \geq 4 \\ 0 & \text{otherwise} \end{cases}$$

For $PUCCH$ format 2 and extended cyclic prefix $h(n_{CQI}, n_{HARQ}, n_{SR}) =$ $$\begin{cases} 10\log_{10}\left(\frac{n_{CQI} + n_{HARQ}}{4}\right) & \text{if } n_{CQI} + n_{HARQ} \geq 4 \\ 0 & \text{otherwise} \end{cases}$$

For $PUCCH$ format 3

When $UE$ is set to transmit $PUCCH$ transferred from higher layer, through two antenna ports, or when $UE$ transmits $HARQ$-$ACK$ of 1 bits or more $h(n_{CQI}, n_{HARQ}, n_{SR}) =$ $$\frac{n_{HARQ} + n_{SR} - 1}{3}$$

Otherwise $h(n_{CQI}, n_{HARQ}, n_{SR}) = \frac{n_{HARQ} + n_{SR} - 1}{2}$ $g(i) = g(i-1) + \sum_{m=0}^{M-1} \delta_{PUCCH}(i - k_m)$: $g(f)$ indicates power control adjustment state of current $PUCCH$, $g(0)$ indicates first value after reset SRS transmission power in the serving cell C may be determined as shown in Equation 3.

$P_{SRS,c}(i) =$ [Equation 3]

$\min\{P_{CMAX,c}(i), P_{SRS\_OFFSET,c}(m) + 10\log_{10}(M_{SRS,c}) +$ $P_{O\_PUSCH,c}(j) + \alpha_c(j) \cdot PL_c + f_c(i)\}$ [dBm]

$P_{SRS\_OFFSET,c}(m)$: 4-bit parameter, semi-statically set in higher layer with respect to $m =$ 0 or $m = 1$ of serving $cell_c$.

($m$ is given value in association with trigger of $SRS$ transmission)

For $K_S = 1.25$, $P_{SRS\_OFFSET,c}(m)$ has $1dB$ step size in the range $[-3, 12]$ dB.

For $K_S = 0$, $P_{SRS\_OFFSET,c}(m)$ has 1.5 dB step size in the range $[-10.5, 12]$ dB.

$M_{SRS,c}$: $SRS$ transmission band

In a case of excess uplink power allocation for a user equipment, a process of PUSCH power allocation is as shown in Equation 4.

1. When total of transmission [Equation 4]

power of $UE$ exceeds $\hat{P}_{CMAX}(i)$ $$\sum_c w(i) \cdot \hat{P}_{PUSCH,c}(i) \leq \left(\hat{P}_{CMAX}(i) - \hat{P}_{PUCCH}(i)\right)$$

2. When $UE$ transmits $PUSCH$ transmission with $UCI$ in serving cell $j$, transmits $PUSCH$ without $UCI$ in another cell, and total of transmission power of $UE$ exceeds $\hat{P}_{CMAX}(i)$ $$\sum_{c \neq j} w(i) \cdot \hat{P}_{PUSCH,c}(i) \leq \left(\hat{P}_{CMAX}(i) - \hat{P}_{PUSCH,j}(i)\right)$$

3. When $UE$ simultaneously transmits $PUCCH$ and $PUSCH$ transmission with $UCI$ in serving cell $j$, transmits $PUSCH$ without $UCI$ in another cell, and total of transmission power of $UE$ exceeds $\hat{P}_{CMAX}(i)$ $$\hat{P}_{PUSCH,j}(i) = \min\left(\hat{P}_{PUSCH,j}(i), \left(\hat{P}_{CMAX}(i) - \hat{P}_{PUCCH}(i)\right)\right)$$

and $$\sum_{c \neq j} w(i) \cdot \hat{P}_{PUSCH,c}(i) \leq \left(\hat{P}_{CMAX}(i) - \hat{P}_{PUCCH}(i) - \hat{P}_{PUSCH,j}(i)\right)$$

Further, in a case of excess uplink power allocation for a user equipment, SRS power allocation is as shown in Equation 5. In this case, when a total of transmission power of a UE exceeds $\hat{P}_{CMAX}(i)$, scaling may be executed.

$\hat{P}_{SRS,c}(i)$ Scaling in subframe $i$ of serving cell $c$ [Equation 5]

$$\sum_c w(i) \cdot \hat{P}_{SRS,c}(i) \leq \hat{P}_{CMAX}(i)$$

FIG. 1 is a diagram illustrating simultaneous PUSCH transmission in a multiple-TA (multiple Timing Advance) environment according to an embodiment of the present invention. A configuration of multiple component carriers may be configured in multiple bands and thus, transmission starting points of the component carriers may be different from one another.

When the starting points of the subframes are different in two component carriers (CC1 and CC2) as shown in FIG. 1, a PUSCH of a component carrier may be transmitted over two subframes of another component carrier which is temporally different from the component carrier. In FIG. 1, a subframe n 120 of CC2 is transmitted over two subframes of the CC1, such as, a subframe n 111 and a subframe n+1 112.

Conventionally, component carriers set for a user equipment have identical time synchronization, and when a sum of required power of the component carriers exceeds a threshold value, power of a PUSCH may be scaled for the component carriers based on a predetermined ratio.

However, when the component carriers have no time synchronization, as shown in FIG. 1, and the sum of required power of the component carriers exceeds the threshold value of the user equipment, a new power allocation scheme may be required. Accordingly, the present invention provides a method of efficiently distributing power in an out-of-synchronization environment, within a scope in which a constant power value is maintained during a subframe when required power of a user equipment exceeds a power threshold value, and provides a selective power distribution scheme based on a modulation scheme of a user equipment during a subframe.

When a sum of required power of each channel exceeds a power threshold value of a user equipment in a simultaneous transmission of a PUSCH and a PUCCH, the present invention allocates uplink power in order of a PUCCH, a PUSCH with UCI, and a PUSCH, based on the inter-channel power allocation priority of Equations 4 and 5.

Hereinafter, a method of allocating power of a PUSCH in a multiple-TA environment will be described.

To allocate power of a PUSCH in the multiple-TA environment, first, second, and third embodiments will be provided.

To apply the first, second, and third embodiments of the present invention, a user equipment applies a multiple-TA (multiple Timing Advanced) in a multiple-component carrier system, including a first component carrier and a second component carrier, and it is formed of the following two steps. m and k are subframe indices, and PUSCH required power refers to an amount of power required for each CC and each subframe, for transmission of a PUSCH. PUSCH transmission power refers to power allocated for each CC and each subframe, through which a PUSCH is transmitted. Further, PUSCH available power refers to power for transmitting a PUSCH, for example, power remaining after excluding, from the total of transmission power, power for components which have priority over the PUSCH in the distribution of power, such as transmission of a PUCCH, transmission of a PUSCH with UCI, or the like. PUSCH assumption power refers to power that is assumed in a process of calculating power for each CC and each subframe, in which a PUSCH is transmitted.

PUSCH transmission power of a subframe m, a subframe k, and a subframe (k+1) may be calculated, based on required power of a PUSCH (Physical Uplink Shared Channel) of the former half and the latter half of the subframe m of the first component carrier, which respectively overlap, in time, the latter half of the subframe k of the second component carrier and the former half of the subframe (k+1), PUSCH available power with respect to the component carriers, and PUSCH required power of the latter half of the subframe k and the former half of the subframe (k+1). Further, the PUSCH transmission power of the subframe m is set based on the calculated power, and uplink transmission to a base station may be executed through the subframe m. The calculation is based on a predetermined component carrier and thus, when a plurality of component carriers exist, for example, when a CC1 and a CC2 exist, transmission power of a predetermined subframe of the CC1 is calculated by regarding the CC1 as a first component carrier and the CC2 as a second component carrier, and transmission power of a predetermined subframe of the CC2 is calculated by regarding the CC2 as the second component carrier and the CC1 as the first component carrier.

As the first embodiment, a method of calculating available power based on needed power of a PUSCH, and applying scaling for each CC will be described.

Figure 2:
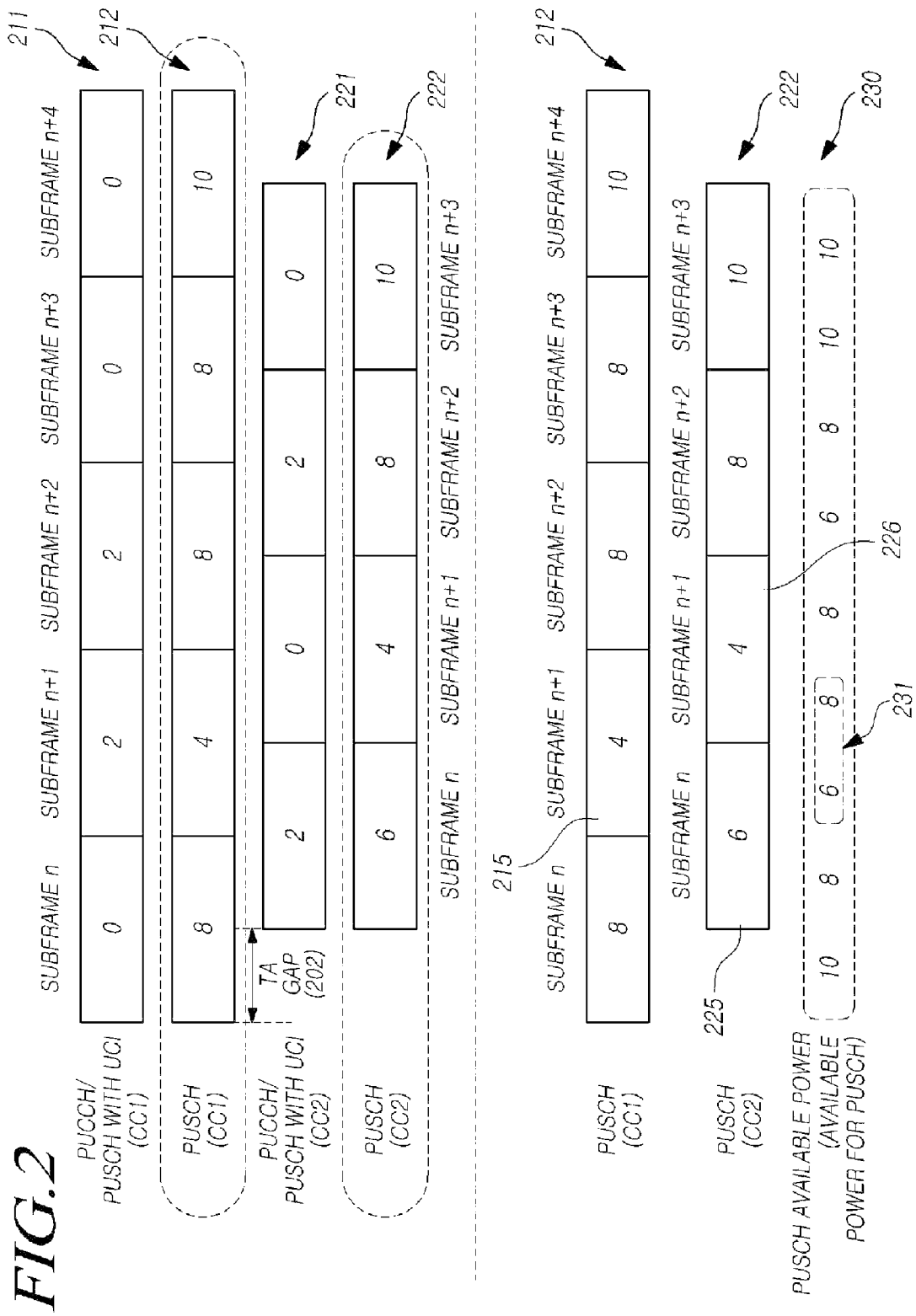
FIG. 2 is a diagram illustrating required power of a PUCCH and a PUSCH in each subframe of each CC.
Figure 3:
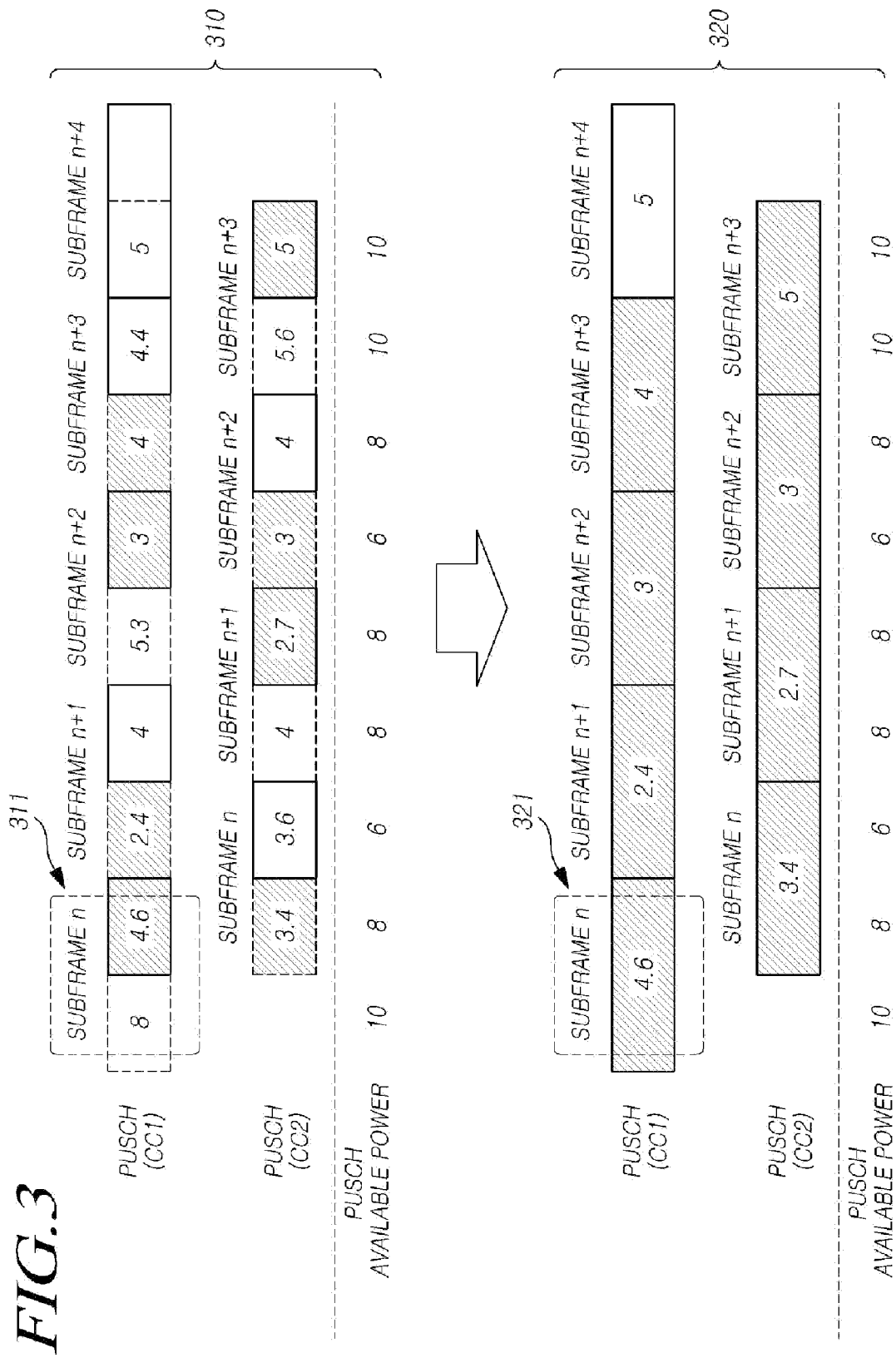
FIG. 3 is a diagram illustrating an example of scaling power of each component carrier at a predetermined ratio in a multiple-TA environment, and determining power to not exceed a power threshold value according to an embodiment of the present invention.

FIGS. 2 and 3 are diagrams illustrating examples of scaling power of each component carrier at a predetermined ratio in a multiple-TA environment, and determining power to not exceed a power threshold value according to an embodiment of the present invention.

FIG. 2 is a diagram illustrating required power of a PUCCH and a PUSCH in each subframe of each CC. In this case, the entire Pcmax is assumed to be 10. In an embodiment of the present invention, a priority of power allocation is given in order of a PUCCH, a PUSCH with UCI, and a PUSCH. Therefore, power is allocated preferentially to the PUCCH and the PUSCH with UCI, and available power, which may be allocable for the transmission of the PUSCH, may be expressed as shown in the diagram 230. The starting points of CCs are different due to a TA gap 202 and thus, a single subframe may be divided into two parts by a boundary of a subframe of another CC, and available power may be independently calculated for each part.

For the PUSCH power allocation of each CC, PUSCH power of each CC is scaled at a predetermined ratio based on required power of a PUSCH and available power for a PUSCH in each CC.

For example, power scaling of a subframe n+1 215 of the CC1 of FIG. 2 may be calculated as follows. Required power of the subframe n+1 215 of the CC1 is 4. Required power of the latter half of a subframe n 225 of the CC2 and the former half of a subframe n+1 226, which respectively overlap the subframe n+1 of the CC1, are 6 and 4, respectively. When each of the subframe regions of the CC1 and the CC2 is divided into two parts by a corresponding subframe boundary, available power of the former half of the subframe n+1 215 of the CC1 is 6 and available power of the latter half is 8. This is shown in the diagram 231. Calculation may be executed as shown in the diagram 230 by applying the described scheme with respect to the former halves/latter halves of all subframes.

To distribute the calculated PUSCH available power for each CC, a scaling factor, w, may be calculated. w may be calculated as PUSCH allocation power for each CC.

That is, the scaling factor w that enables, to be identical to the available power 230, a value obtained by applying w to the required power of the CC1 and the PUSCH required power (needed power) of the CC2 which overlaps the needed power of the CC1, may be calculated. Hereinafter, the needed power and the required power have an identical meaning $$w^*(\text{needed power of overlap part of CC1}) + w^* \\ (\text{needed power of overlap part of CC2}) = \text{available power in overlap part} \quad \text{[Equation 6]}$$

For example, in FIG. 2, when Equation 6 is applied to calculate a power scaling factor of the former half of the subframe n+1 215 of the CC1, w*4+w*6=6, and w is 0.6. In the above description, 4 is the needed power of the former half of the subframe n+1 215 of the CC1 and 6 is the needed power of the latter half of the subframe n 225 of the CC2. The two parts overlap.

When the power scaling of the former half of the subframe n+1 215 of the CC1 is calculated by applying the scaling factor w, 2.4 is obtained through 4*0.6. In this manner, when the power scaling of the latter half of the subframe n 225 of the CC2, which overlaps the former half of the subframe n+1 215 of the CC1, is calculated, 3.6 is obtained through 6*0.6.

In this manner, when Equation 6 is applied to calculate a power scaling factor of the latter half of the subframe n+1 215 of the CC1, w*4+w*4=8, and w is 1. When the power scaling of the latter half of the subframe n+1 215 of the CC1 is calculated, 4 is obtained through 4*1. In this manner, when the power scaling of the former half of the subframe n+1 226 of the CC2, which overlaps the latter half of the subframe n+1 215 of the CC1, is calculated, 4 is obtained.

FIG. 3 is a diagram illustrating an example of scaling power of each component carrier at a predetermined ratio in a multiple-TA environment, and determining power to not exceed a power threshold value according to an embodiment of the present invention.

The diagram 310 of FIG. 3 illustrates power scaling of the former half and the latter half of a subframe that is distinguished by a TA, by applying Equation 6.

In this example, power is maintained at a predetermined rate in a single frame and thus, to allocate power to a PUSCH within the scope in which the allocated power does not exceed a power threshold value of a user equipment, a value in an area marked by slash is selected to be power of a subframe in the diagram 310 and power may be determined for each subframe as shown in the diagram 320 of FIG. 3. For example, in the case of a subframe n 311 of a CC1 in the diagram 310, power of the former half is 8 and power of the latter half is 4.6, and 4.6, which is the smaller value, is selected. Accordingly, PUSCH allocation power of a subframe n 321 of the CC1 is 4.6, as shown in the diagram 320.

When two or more component carriers are configured, the component carriers are grouped based on a TA (Timing Advance) group unit, and required power of each TA group may be a sum of component carriers included in a TA group. As shown in FIGS. 2 and 3, each TA group is scaled based on a predetermined ratio. The power of a TA group is scaled again using a predetermined ratio based on required power of each component carrier, and distributed as power of each component carrier.

This method allocates power based on PUSCH required power of each CC in the case of excess over a power threshold of a user equipment and thus, power distribution is readily executed. Therefore, a calculation-processing process may be reduced when a user equipment distributes power. Conversely, there is a limit to the effective use of the available power for power allocation of a PUSCH.

That is, the process of calculating the subframe n+1 of the CC1 in FIGS. 2 and 3 will be described as follows. Allocable power of 2.4, which is allocable to the former half of the subframe n+1, is calculated by scaling required power of 4 of the former half of the subframe n+1 and required power of 6 of the latter half of the subframe n of the CC2, from the PUSCH available power of 6 during a time corresponding to the former half of the subframe n+1, allocable power of 4, which is allocable to the latter half of the subframe n+1, is calculated by scaling required power of 4 of the latter half of the subframe n+1 and required power of 4 of the former half of the subframe n+1 of the CC2, from the PUSCH available power of 8 during a time corresponding to the latter half of the subframe n+1, and a minimum value of 2.4 from among the allocable power, which may be allocable to the former half and the latter half of the subframe n+1, obtained through scaling, is set to be the power of the subframe n+1.

The first embodiment conserves computing power consumed for determining power allocation of a user equipment, but has a limit to the effective use of the available power. Hereinafter, the second embodiment will be described, which enhances the effective use of the available power.

The second embodiment illustrates a method of calculating available power using required power of a PUSCH so as to apply scaling for each CC, and predicting power allocation for each subframe so as to determine power distribution of a current subframe.

That is, the second embodiment scales power of each component carrier based on a predetermined ratio, predicts power allocation of a previous subframe and power allocation of a subsequent subframe, and determines the power distribution of the current subframe.

Figure 4:
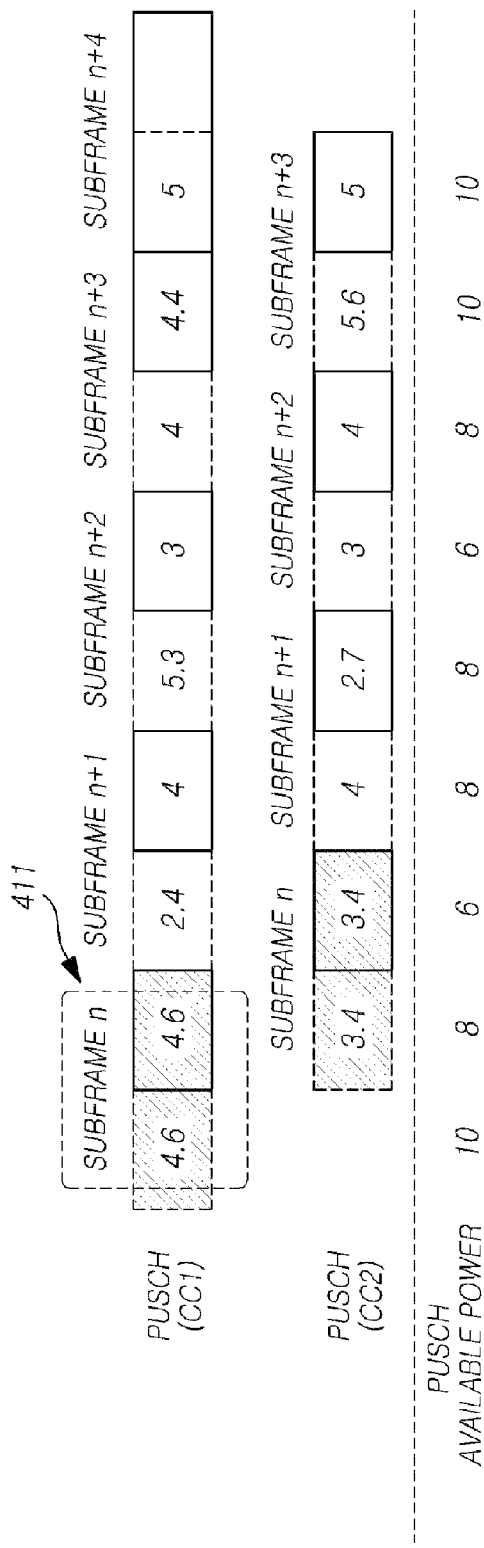
FIG. 4 is a diagram illustrating PUSCH power distribution for a subframe n of a CC1 and a subframe n of a CC2, determined in the diagram 310 of FIG. 3.

FIG. 4 is a diagram illustrating PUSCH power distribution for a subframe n of a CC1 and a subframe n of a CC2, determined in the diagram 310 of FIG. 3. When power allocation of the former half of a subframe n 411 of a CC1 is 4.6, it indicates that the power is previously allocated from the perspective of time. That is, the power distribution may be determined based on chronological order. Therefore, the order of power distribution is subframe n(CC1)->subframe n(CC2)->subframe n+1 (CC1)->subframe n+1(CC2) . . . , and the like. In FIG. 4, the subframe n of the CC1 and the subframe n of the CC2, which are marked by slash, indicate that the power distribution has been determined. The process of executing power distribution of subframes based on chronological order will be described with reference to FIG. 5.

Figure 5:
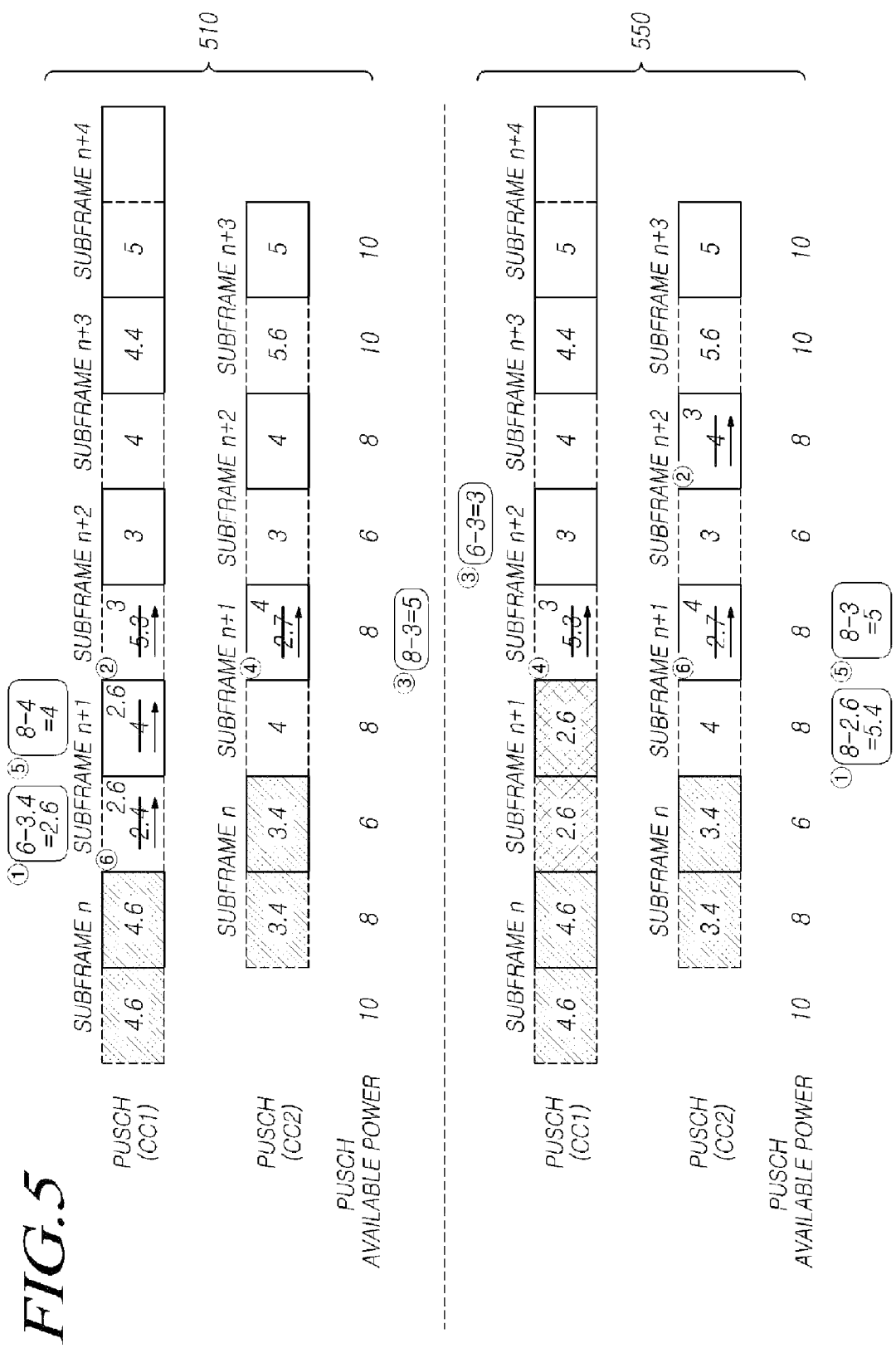
FIG. 5 is a diagram illustrating a process of determining power distribution for each subframe, in chronological order, according to a second embodiment of the present invention.

FIG. 5 is a diagram illustrating a process of determining power distribution for each subframe, in chronological order, according to a second embodiment of the present invention. The descriptions will be provided based on the power distribution of the subframe n of the CC1. The power distribution for the subframe n of the CC1 and the subframe n of the CC2 has been determined to be 4.6 and 3.4, respectively. Therefore, based on the above mentioned order, it is a time for determining the power distribution of the subframe n+1 of the CC1. Power is distributed based on the following procedure, as shown in the diagram 510. ①②③④⑤⑥ in the diagram 510 indicate steps 1, 2, 3, 4, 5, and 6, respectively.

Step 1 (①): The power of the subframe n of the CC2 is 3.4 and thus, the former half of a subframe n+1 of the CC1, which overlaps the corresponding subframe, has power remaining after subtracting the power of 3.4, which is allocated to the CC2, from the available power of the PUSCH of 6.

Step 2 (②): A lower value among distribution power of the former half and the latter half of a subframe n+2 of the CC1 is selected, and the selected value is assumed to be a power value of the subframe. The reason that the smaller power value is selected, is to prevent the excess over a power threshold value during subsequent processes.

Step 3 (③): The power of the subframe n+2 of the CC1 is assumed to be 3 and thus, remaining power for the power distribution of the latter half of the subframe n+1 of the CC2, which overlaps the subframe n+2 of the CC1 and executes transmission, is 5.

Step 4 (④): The required power of the subframe n+1 of the CC2 is 4, and the remaining power is 5 and thus, the power of the subframe n+1 of the CC2 is assumed to be 4.

Step 5 (⑤): The power distribution of the subframe n+1 of the CC2 is assumed to be 4 and thus, the remaining power to be allocated to the latter half of the subframe n+1 of the CC1 is 4.

Step 6 (⑥): The remaining power for the former half of the subframe n+1 of the CC1 is 2.6 in the step 1 (①) and the remaining power for the latter half is 4 in the step 5 (⑤) and thus, 2.6 is allocated as the power of the subframe n+1 of the CC1.

Subsequently, this is a time to determine the power distribution of the subframe n+1 of the CC2. Power is distributed based on the following procedure, as shown in the diagram 550. ①②③④⑤⑥ in the diagram 550 indicate steps 1, 2, 3, 4, 5, and 6, respectively. The power of the subframe n+1 of the CC1 has been distributed as 2.6, through the steps 1 through 6 of the diagram 510.

Step 1 (①): The power of the subframe n+1 of the CC1 has been distributed as 2.6 and the former half of the subframe n+1 of the CC2, which overlaps the corresponding subframe, has the power remaining after subtracting the power of 2.6, allocated to the CC1, from the available power of the PUSCH of 8.

Step 2 (②): A lower value among the distribution power of the former half and the latter half of the subframe n+2 of the CC2 is selected, and the selected value is assumed to be a power value of the subframe. The reason that the smaller power value is selected is to prevent the excess over a power threshold value during subsequent processes.

Step 3 (③): The power of the subframe n+2 of the CC2 is assumed to be 3 and thus, the remaining power for the power distribution of the former half of the subframe n+2 of the CC1, which overlaps the subframe n+2 of the CC2 and executes transmission, is 3.

Step 4 (④): The required power of the subframe n+2 of the CC1 is 5.3, and the remaining power is 3 and thus, the power of the subframe n+2 of the CC1 is assumed to be 3.

Step 5 (⑤): The power distribution of the subframe n+2 of the CC1 is assumed to be 3 and thus, the remaining power for allocation for the latter half of the subframe n+1 of the CC2 is 5.

Step 6 (⑥): The remaining power for the former half of the subframe n+1 of the CC2 is 5.4 in the step 1 (①), the remaining power for the power distribution for the latter half is 5 in the step 5 (⑤), and the needed power of the subframe n+1 of the CC2 is 4 and thus, 4 is allocated.

Through the above described processes, the power distribution is determined based on the above described order.

Figure 6:
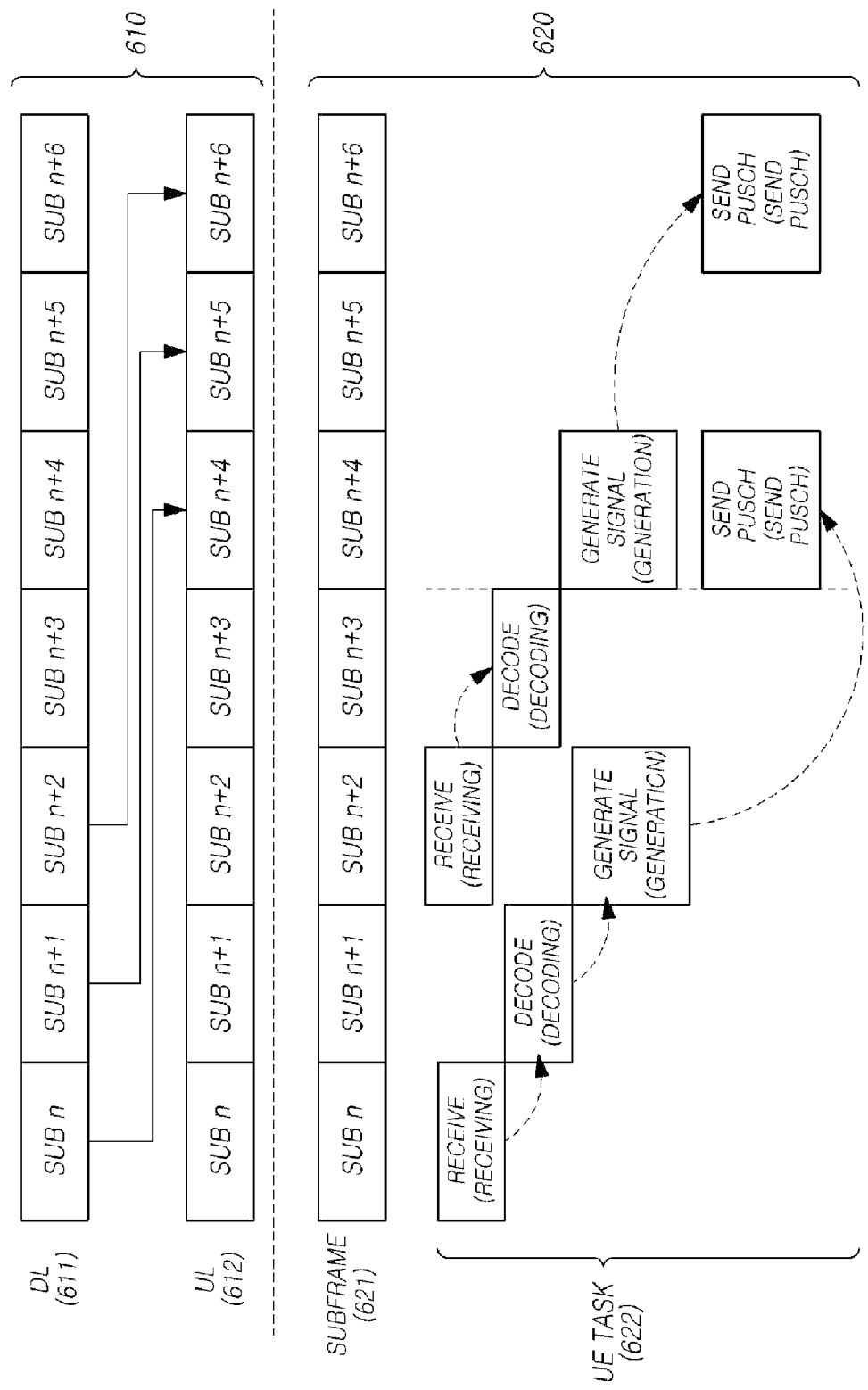
FIG. 6 is a diagram illustrating a range of a future (subsequent) subframe, which may be taken into consideration for power distribution, according to an embodiment of the present invention.

FIG. 6 is a diagram illustrating a range of a future (subsequent) subframe, which may be taken into consideration for power distribution, according to an embodiment of the present invention.

The second embodiment assumes an amount of power required of a future subframe, and distributes power of a current subframe based on the assumption, when determining power of a subframe. The diagram 610 of FIG. 6 shows a range of a future subframe that may be taken into consideration for distribution of power of a current subframe. The diagram 610 shows triggering and transmission of a PUSCH (Triggering and transmission of PUSCH).

In the diagram 610, the diagrams 611 and 612 indicate a downlink and an uplink, respectively. As shown in the diagram 610, transmission of a PUSCH is executed 4 subframes after receiving a PDCCH that indicates PUSCH transmission. When the PDCCH that indicates the PUSCH transmission is received in a subframe n (Sub n), the PUSCH transmission may be executed after 4 subframes (Sub n+4).

The diagram 620 illustrates a process, executed in a user equipment, from receiving a PDCCH to transmitting a PUSCH (UE Procedure for sending PUSCH). In the diagram 620, the diagram 621 indicates a temporal range of each subframe, and the diagram 622 indicates a task executed by the user equipment in a corresponding subframe.

The user equipment executes the processes of receiving a PDCCH (Receiving)->decoding (decoding)->generating a signal(Signal generation)->transmitting a PUSCH (Send PUSCH). Accordingly, when the user equipment determine power distribution for transmission of a PUSCH in the subframe n+4, the user equipment executes allocation based on an amount of power required of a subframe n+6 since decoding of the PDCCH, which is newly received in the subframe n+2 has been completed. That is, in the described embodiment, the power for the PUSCH transmission is allocated based on only an amount of power required for one subsequent subframe due to the complexity. However, the power allocation may be executed based on an amount of power required of a maximum of two subsequent subframes.

Accordingly, when the process of FIG. 5 is described based on the subframe n+1 of the CC1, the PUSCH assumption power (2.4) for the former half of the subframe n+1 is calculated by scaling required power of the former half of the subframe n+1 and required power of the latter half of the subframe of the CC2, from the PUSCH available power during a time corresponding to the former half of the subframe n+1 of the CC1. The process of calculating the PUSCH assumption power (4) for the latter half of the subframe n+1 of the CC1 by scaling required power of the latter half of the subframe n+1 of the CC1 and required power of the former half of the subframe n+1 of the CC2, from the PUSCH available power during a time corresponding to the latter half of the subframe n+1 of the CC1, has been described with reference to FIG. 3.

The PUSCH transmission power of the subframe n+1 is calculated based on the PUSCH assumption power (2.4 and 4) of the former half/latter half of the subframe n+1 of the CC1, PUSCH transmission power (4) of the subframe n of the CC2, PUSCH assumption power of the subframe n+2 (5.3->3), and PUSCH assumption power (2.7->4) of the subframe n+1 of the CC2.

When two or more component carriers are configured, the component carriers are grouped based on a TA (Timing Advance) group unit, and required power of each TA group may be a sum of required power of the component carriers included in a TA group. As shown in FIG. 5, each TA group is scaled based on a predetermined ratio. The power of a TA group is scaled again using a predetermined ratio based on required power of each component carrier, and distributed as power of each component carrier.

That is, when a plurality of CCs is configured in a single TA group, the TA group may reflect a sum of required power of the plurality of CCs.

For the power distribution, the second embodiment executes allocation after comparing required power of a user equipment of each CC and power remaining after allocation and thus, the efficiency of the power distribution may be optimized. However, the power allocation of a subsequent subframe needs to be considered and thus, the complexity is high.

That is, based on the comparison between the first embodiment and the second embodiment, the first embodiment has a simple calculation process and thus, consumes a small amount of power of a UE but has a lower power distribution efficiency than the second embodiment. Conversely, the second embodiment has a higher power distribution efficiency, but has a little bit complex calculation process and thus, may use power of a UE more than the first embodiment.

Subsequently, the third embodiment will be described, which distributes power based on a modulation scheme of a subframe. In particular, the third embodiment selectively distributes power based on an uplink modulation scheme of a user equipment. That is, PUSCH transmission power of a subframe m of a first component carrier may be set based on a modulation scheme of the subframe m of the first component carrier and a modulation scheme of a subframe k and a subframe (k+1) of a second component carrier.

In a multiple-TA environment, each component carrier has an independent transmission time from one another. Therefore, the transmission time of a user equipment may be out of synchronization.

FIG. 7 is a diagram illustrating an example of error detection caused by power scaling when two symbols of another component carrier consecutively exist in a single symbol section of a component carrier in a multiple-TA environment, where a third embodiment of the present invention, is applicable.

First, the diagram 710 shows an example in which a symbol section of a component carrier overlaps two symbol sections of another component carrier in the multiple-TA. As shown in the diagram 712, two symbol sections consecutively exist in a CC2 during a single symbol section of a CC1 (non-aligned symbol timing in multiple-TA).

A PUSCH is formed of a data symbol and an RS symbol. The data symbol selectively uses one of QPSK (Quadrature Phase Shift Keying), 16QAM (Quadrature amplitude modulation), and 64QAM. In this instance, QPSK transfers information using a phase, but 16QAM and 64QAM, which correspond to an amplitude modulation scheme, are affected by a size of a transmitted symbol in addition to the phase. Accordingly, when power applied to an RS and power applied to data do not match in a case in which data modulated based on 16QAM or 64 QAM is transmitted, error detection may occur in a receiving side due to the unintended information.

The diagram 720 shows error detection occurring when power scaling is executed based on 16QAM.

That is, the diagram 720 assumes that an RS of a PUSCH is received at P1 and the last two symbols 722 of the subframe are received at P2 due to the effect of the multiple-TA. When power of P1 is greater than P2, that is, P1>P2, the error detection may be caused during signal detection, as shown in the diagram 724 (error detection because of power scaling).

That is, in the case of 16QAM or 64QAM, when power is changed in a single subframe, error detection may be caused when a received signal is detected and thus, power needs to be constantly maintained during a single subframe.

Conversely, QPSK transfers information using only a phase and thus, a change in power is allowed in a single subframe as per a power allocation request of each component carrier. Accordingly, a modulation scheme of a subframe is taken into consideration for the allocation of power of each component carrier. Hereinafter, when simultaneous transmission of a PUSCH and a PUSCH of another component carrier is required in a multiple-TA environment, a scheme of applying power allocation distinguished based on a modulation scheme, as shown in reference 1, 2, and 3, will be described.

Figure 8:
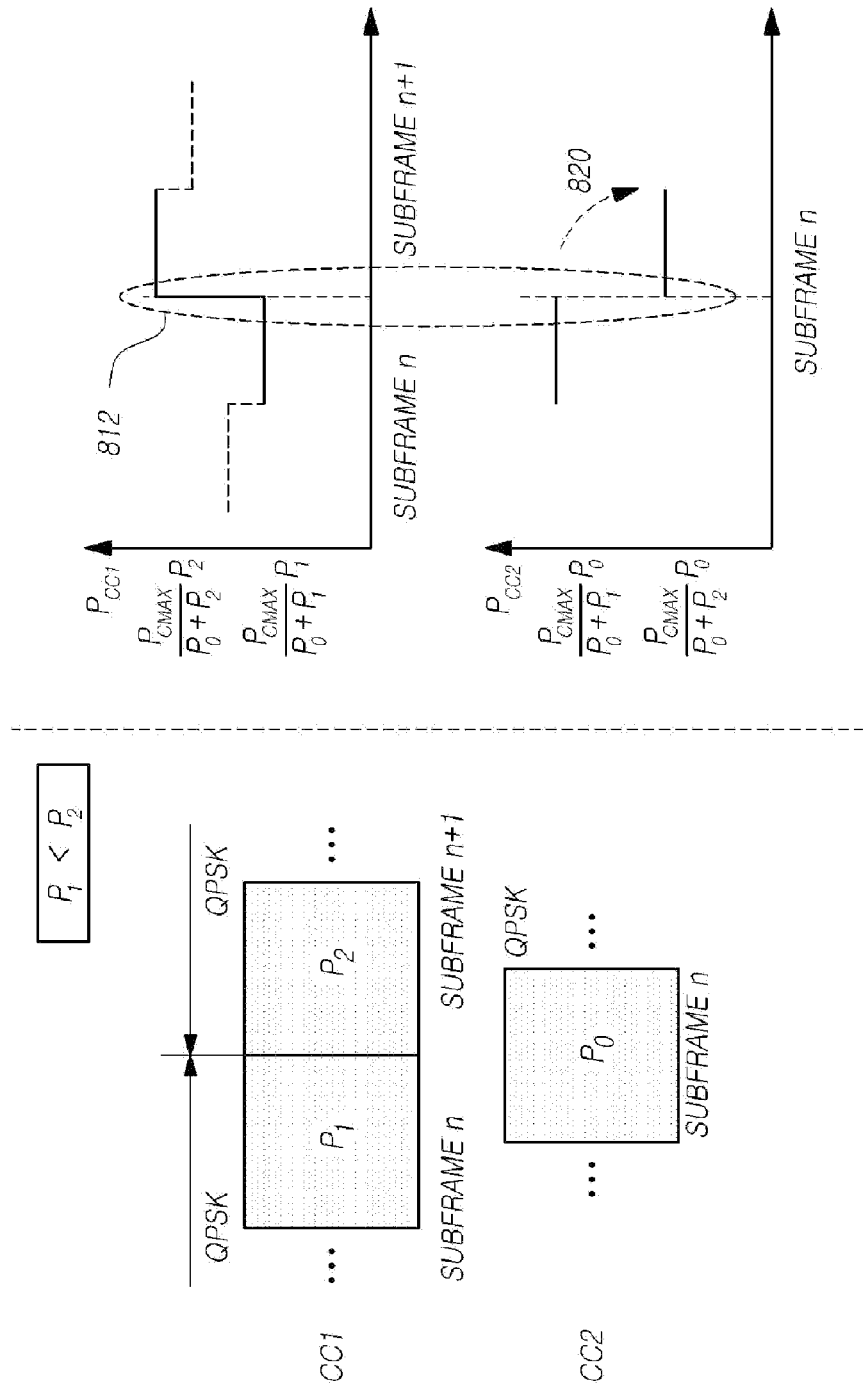
FIG. 8 is a diagram illustrating a method of allocating power in a boundary section of a subframe by applying a reference 1 of the third embodiment of the present invention.

FIG. 8 is a diagram illustrating a method of allocating power in a boundary section of a subframe based on the reference 1 of the third embodiment of the present invention. According to the reference 1 of the third embodiment, when a modulation scheme of each subframe that determines power allocation based on a boundary of a subframe is a phase modulation scheme (Phase Shift Keying), such as QPSK, BPSK(Binary Phase Shift Keying), and the like, a conventional power allocation scheme such as Rel-10 is used.

The power allocation for an overlap part is executed based on a symbol unit, and a method of scaling power of each component carrier at a predetermined ratio, based on required power of each component carrier, may be applied, in the same manner as Rel-10.

In FIG. 8, all of a subframe n and a subframe n+1 of a CC1, and a subframe n of a CC2 use a QPSK modulation scheme. The QPSK modulation scheme transfers information associated with data using a phase and thus, a change in power may be allowed in a single subframe. Therefore, power may be changed in a boundary 812 of the subframes of the CC1 and the CC2, and power allocation in a subframe section is changed from $$\frac{P_{CMAX}}{P_0 + P_1} P_0$$

to $$\frac{P_{CMAX}}{P_0 + P_2} P_0$$

in the subframe n of the CC2 as shown in the diagram 820.

Figure 9:
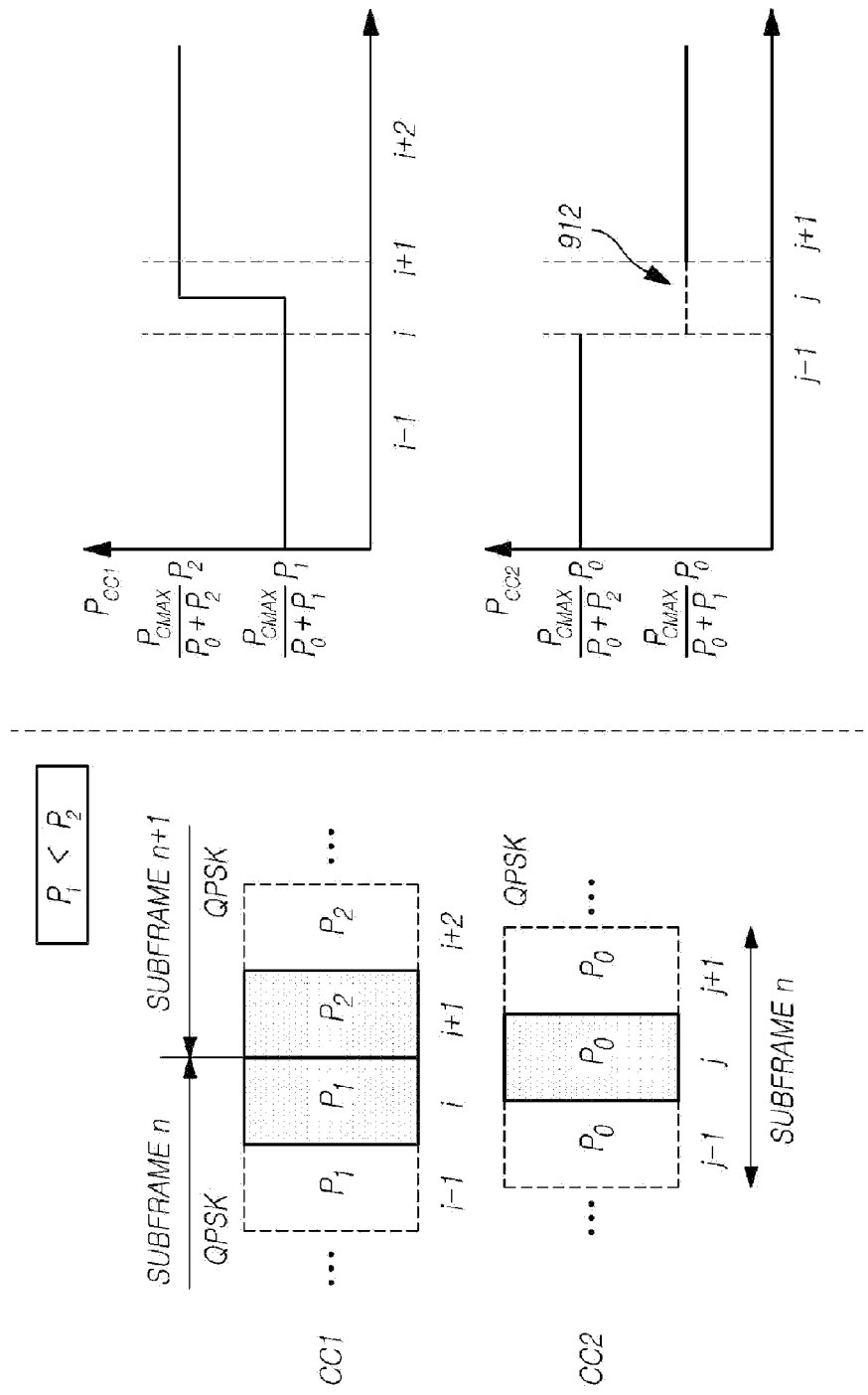
FIG. 9 is a diagram illustrating a method of allocating power in a boundary section of a subframe, based on a symbol unit, by applying the reference 1 of the third embodiment of the present invention.

FIG. 9 is a diagram illustrating a method of allocating power in a boundary section of a subframe based on a symbol unit, by applying the reference 1 of the third embodiment of the present invention.

Allocation of power of P1 is required in the subframe n of a CC1, and allocation of power of P2 is required in the subframe n+1. Power of P0 is required in a CC2 and a symbol j of the CC2 is located between symbols i and i+1 of the CC1 due to the different TAs of the two CCs. In this example, when required power of the two CCs exceeds PCMAX, the power allocation of two CCs may be based on the power allocation, as shown in the diagram on the right side of FIG. 10.

That is, for the subframe n and the subframe n+1 of the CC1, a power allocation scheme that is scaled at an identical ratio based on a power allocation distribution rule of the CC1 and the CC2, is applied. For a symbol (j) that is located in a boundary of a subframe of another CC, such as the jth symbol in the subframe n of the CC2, a smaller power is selected by comparing allocation power of the symbols on the left and right sides of the symbol. Through the above described power allocation, the power allocation may be executed within a range that does not exceed PCMAX.

That is, as described in FIG. 8, when both the modulation scheme of the subframe n of the CC2 and the modulation scheme of the subframe n and the subframe (n+1) of the CC1 correspond to a phase modulation (Phase Shift Keying) scheme, PUSCH transmission power may be set to be changed in the subframe n of the CC2.

Also, as described in FIG. 9, when both the modulation scheme of the subframe n of the CC2 and the modulation scheme of the subframe n and the subframe (n+1) of the CC1 correspond to a phase modulation (Phase Shift Keying) scheme, the PUSCH transmission power may be set to be changed in one (j of FIG. 9) of the symbols forming the subframe n of the CC2.

Figure 10:
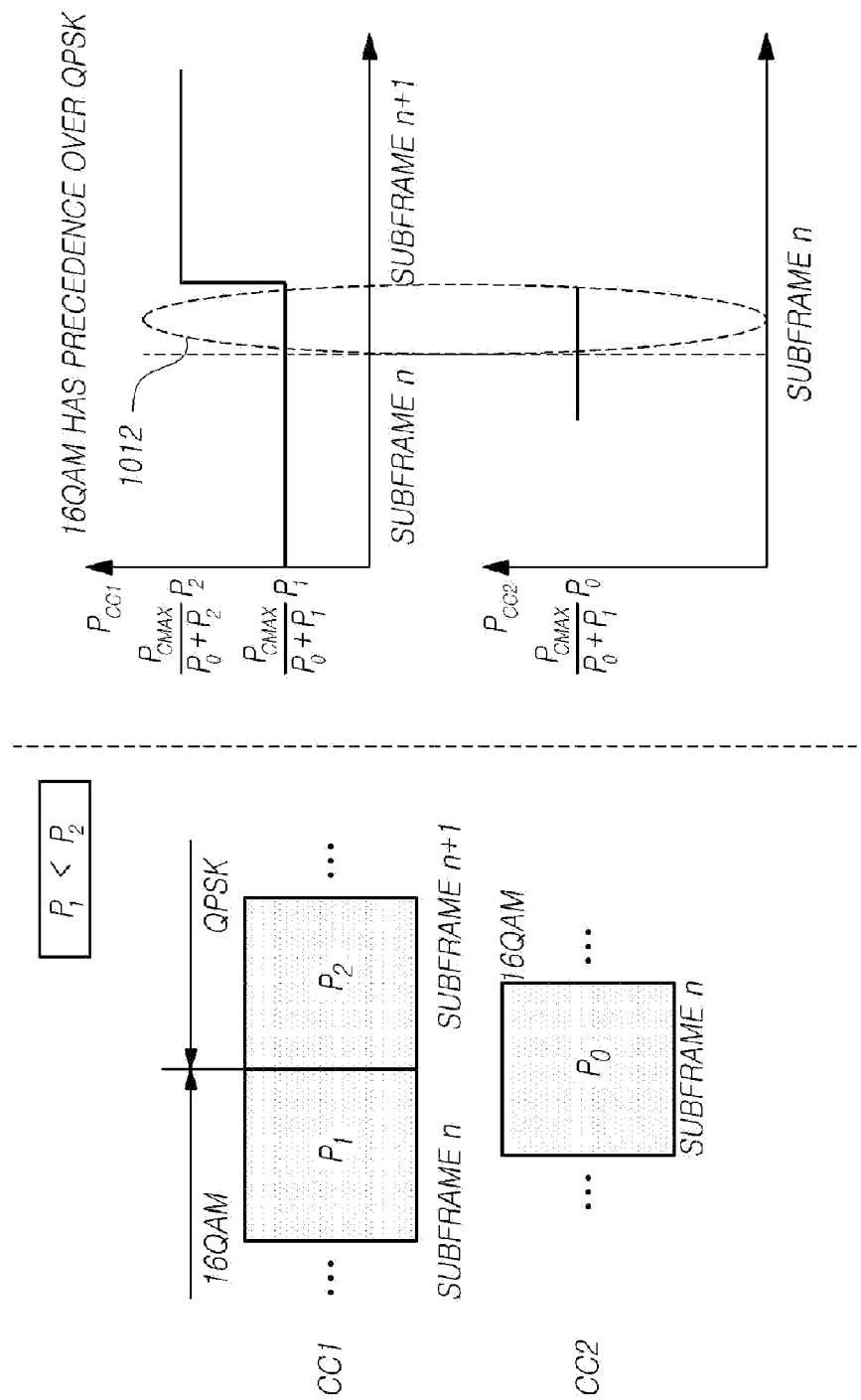
FIG. 10 is a diagram illustrating an example of preferentially allocating power for 16QAM or 64QAM by applying a reference 2 of the third embodiment of the present invention when modulation schemes of subframes are different.

FIG. 10 is a diagram illustrating an example of preferentially allocating power for 16 QAM or 64 QAM by applying the reference 2 of the third embodiment of the present invention when modulation schemes of subframes are different.

According to the reference 2 of the third embodiment, power allocation may be preferentially executed with respect to 16QAM (or 64QAM), when power allocation is determined based on a subframe boundary and the modulation schemes of subframes are different, such as QPSK, 16QAM (or 64QAM). That is, for the case of 16QAM and 64QAM, a constant power allocation is maintained during a single subframe.

In FIG. 10, a PUSCH of 16QAM is transmitted in a subframe n of a CC1, and a PUSCH of QPSK is transmitted in a subframe n+1. Further, a PUSCH of 16QAM is transmitted in a CC2. In this example, a change in power in a subframe of 16QAM may cause error detection and thus, a 16 QAM PUSCH of the CC2 maintains a constant power as shown in the diagram 1012, and a QPSK PUSCH of the CC1 is transmitted with a lower power than power allocated by scaling of a predetermined ratio of Rel-10, during a section where the subframe n of the CC2 is maintained.

That is, when the modulation scheme of the subframe n of the CC2 is an amplitude modulation scheme, and a modulation scheme of the subframe (n+1) of the CC1 is a phase modulation scheme, the PUSCH transmission power is set to not be changed in the subframe n of the CC2, and the PUSCH transmission power is set to be changed in the subframe (n+1) of the CC1.

Figure 11:
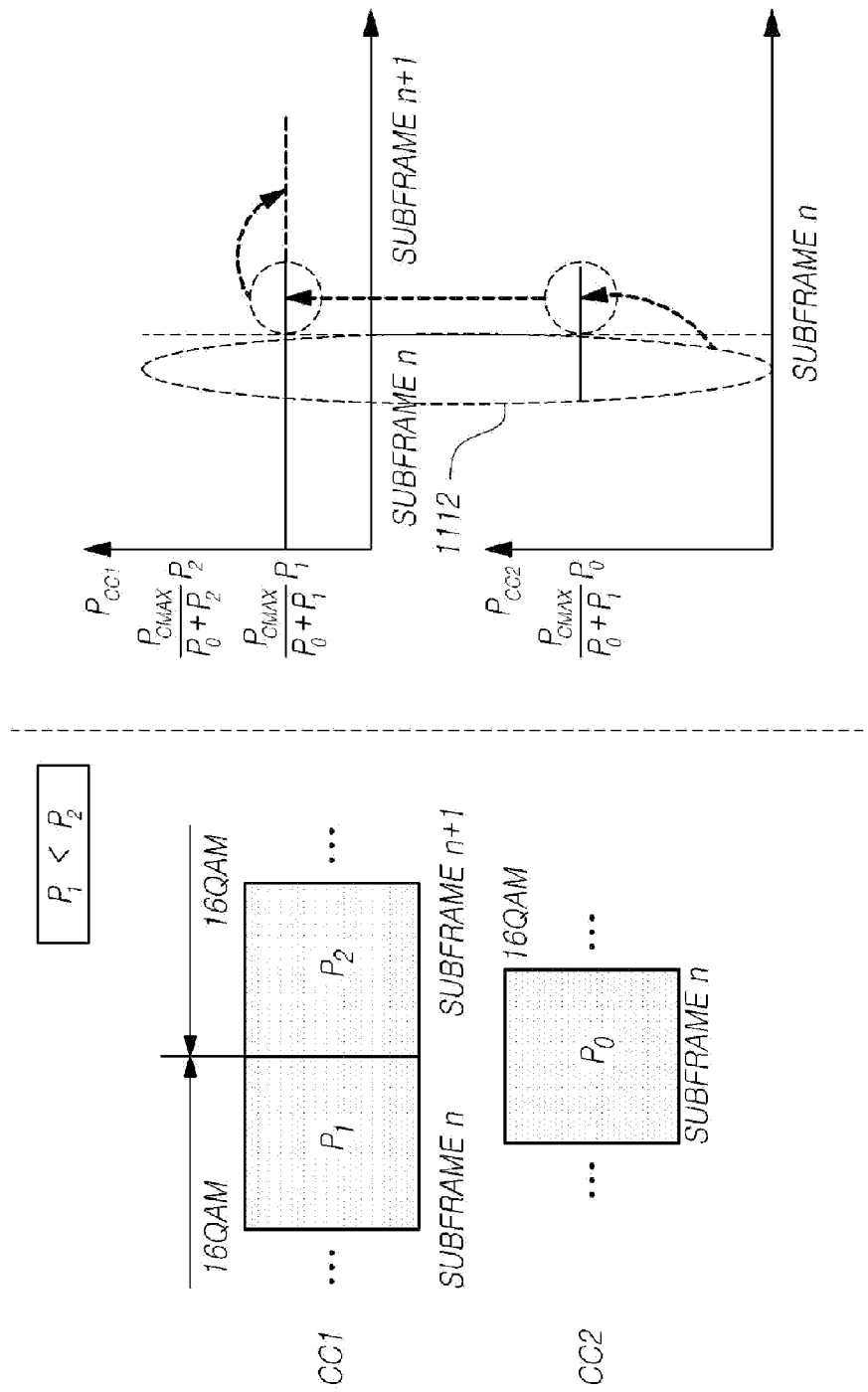
FIG. 11 is a diagram illustrating an example of allocating power when all of the modulation schemes of subframes correspond to 16QAM or 64QAM by applying a reference 3 of the third embodiment of the present invention.

FIG. 11 is a diagram illustrating an example of allocating power when all of the modulation schemes of subframes correspond to 16QAM or 64QAM by applying the reference 3 of the third embodiment of the present invention.

According to the reference 3 of the third embodiment, when all of the modulation schemes of subframes, which consider power allocation based on a subframe boundary, correspond to 16QAM or 64QAM, power may be preferentially allocated to a temporarily earlier subframe and power is allocated to a subsequent subframe based on the previous power allocation. For the case of 16QAM and 64QAM, a constant power allocation is maintained during a single subframe.

That is, the power of a subframe n of a CC2 is determined to be $$\frac{P_{CMAX}}{P_0 + P_1} P_0$$

based on a scaling ratio in association with a subframe n of a CC1. In a boundary area of the subframes n and n+1 of the CC1, the CC2 has 16 QAM PUSCH transmission in the subframe n and thus, a change in power is not given as shown in the diagram 1112. Therefore, for the subframe n+1 of the CC1, an initial power allocation value $$\frac{P_{CMAX}}{P_0 + P_1} P_1$$

is determined based on the power of the subframe n of the CC2, and the power is constantly maintained during the subframe n+1.

That is, when all of the modulation scheme of the subframe n of the CC2 and the modulation scheme of the subframe n and the subframe (n+1) of the CC1 correspond to an amplitude modulation scheme, PUSCH transmission power of the subframe n of the CC2 is preferentially allocated and PUSCH transmission power of the subframe (n+1) of the CC1 is set to be identical to PUSCH transmission power of the subframe n of the CC1.

When two or more component carriers are configured, the component carriers are grouped based on a TA (Timing Advance) group unit, and required power of each TA group may be a sum of required power of the component carriers included in a TA group. Meanwhile, in a case in which a plurality of CCs is configured in a single TA group, each TA group may be scaled at a predetermined ratio when the modulation schemes of the CCs are identical to one another. The power of a TA group is scaled again using a predetermined ratio based on required power of each component carrier, and distributed as power of each component carrier.

Figure 12:
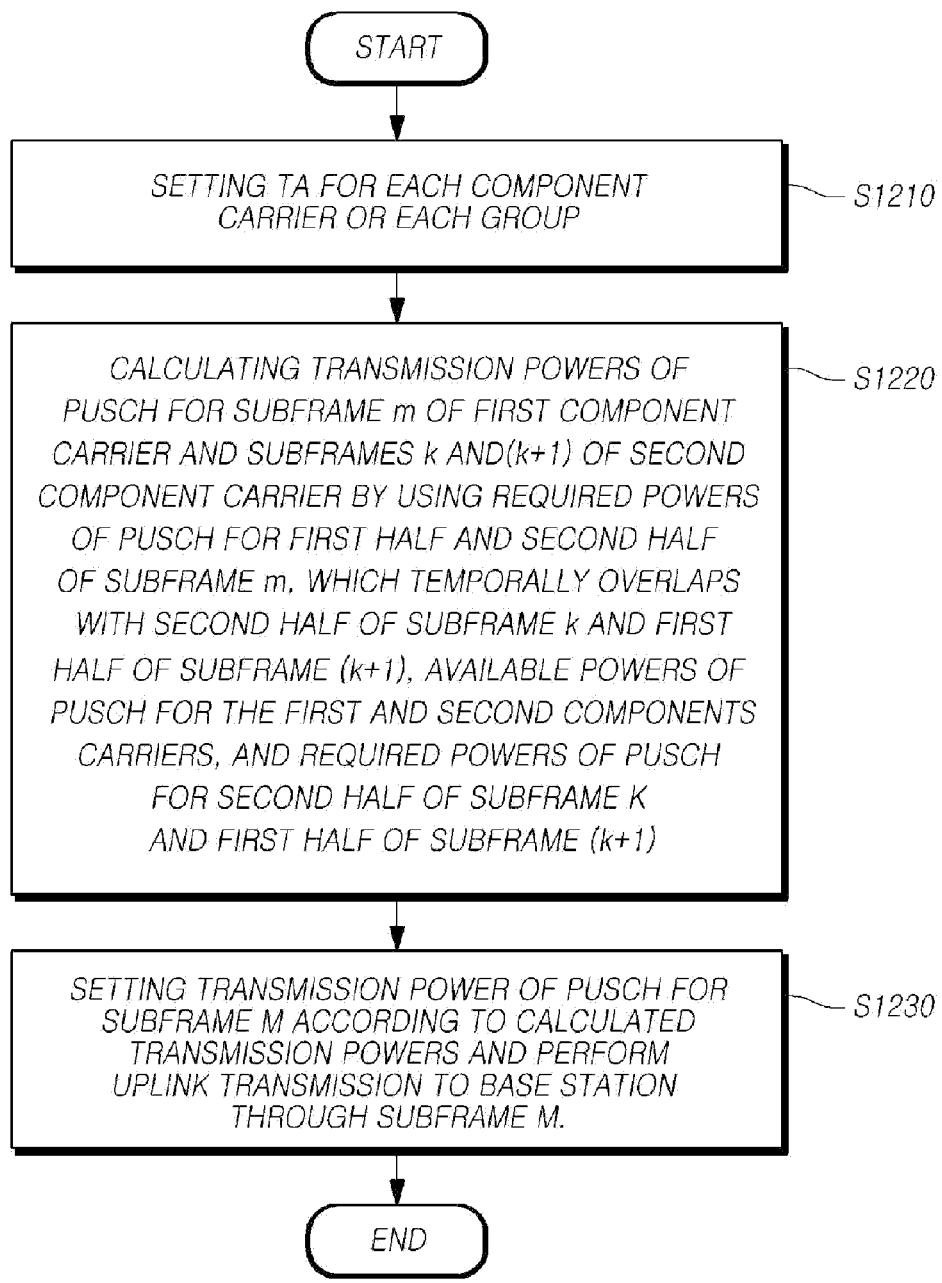
FIG. 12 is a diagram illustrating a method in which a user equipment allocates uplink power in a multiple-TA environment, according to an embodiment of the present invention.

FIG. 12 is a diagram illustrating a method in which a user equipment allocates uplink power in a multiple-TA environment, according to an embodiment of the present invention. FIG. 12 is a process, executed in a user equipment that applies a multiple-TA (Multiple Timing Advanced) in a multiple component carrier system, including a first component carrier and a second component carrier.

First, a TA for each component carrier or a TA for each group is set in operation S1210. Subsequently, PUSCH (Physical Uplink Shared Channel) transmission power of a subframe m, a subframe k, and a subframe (k+1) may be calculated in operation S1220, based on required power of a PUSCH of the former half and the latter half of the subframe m of the first component carrier, which respectively overlap, in time, the latter half of the subframe k and the former half of the subframe (k+1) of the second component carrier, PUSCH available power with respect to the component carriers, and PUSCH required power of the latter half of the subframe k and the former half of the subframe (k+1). Here, the subframe m of the first component carrier is a TA ahead of the subframe k of the second component carrier.

The calculation process of operation S1220 may be different for each of the embodiments 1, 2, and 3.

In the case of the first embodiment (please refer to FIGS. 2 and 3), operation S1220 may be embodied as follows. Power allocable to the front half of the subframe m, is calculated by scaling required power of the front half of the subframe m and required power of the latter half of the subframe k, from PUSCH available power during a time corresponding to the former half of the subframe m. Power allocable to the latter half of the subframe m, is calculated by scaling required power of the latter half of the subframe m and required power of the front half of the subframe k+1, from PUSCH available power during a time corresponding to the latter half of the subframe m. Subsequently, a minimum value among the allocable power, which may be allocable to the front half and the latter half of the subframe m, obtained through scaling, may be allocated as power of the subframe m.

According to the second embodiment (please refer to FIGS. 5 and 6), operation S1220 includes the steps 1 through 6 of FIG. 5, and is embodied as follows. PUSCSH assumption power for the front half of the subframe m is calculated by scaling required power of the front half of the subframe m and required power of the latter half of the subframe k, from PUSCH available power during a time corresponding to the former half of the subframe m. PUSCH assumption power for the latter half of the subframe m is calculated by scaling required power of the latter half of the subframe m and required power of the front half of the subframe (k+1), from PUSCH available power during a time corresponding to the latter half of the subframe m. Subsequently, PUSCH transmission power of the subframe m is calculated based on the PUSCH assumption power of the former half and the latter half of the subframe m, PUSCH transmission power of the subframe k, PUSCH assumption power of the subframe (m+1), and PUSCH assumption power of the subframe (k+1).

According to the third embodiment (FIGS. 8, 9, 10, and 11), operation S1220 sets PUSCH transmission power of the subframe m, based on a modulation scheme of the subframe m and a modulation scheme of the subframe k and the subframe (k+1).

Particularly, according to the reference 1 of the third embodiment, when both the modulation scheme of the subframe m and the modulation scheme of the subframe k and the subframe (k+1) correspond to a phase modulation (Phase Shift Keying) scheme, as shown in FIG. 8, the PUSCH transmission power is set to be changed in the subframe m.

Also, as shown in FIG. 9, the PUSCH transmission power is set to be changed in one of the symbols forming the subframe m.

According to the reference 2 of the third embodiment, when the modulation scheme of the subframe m is an amplitude modulation scheme, and a modulation scheme of at least one of the subframe k and the subframe (k+1) is a phase modulation scheme, as shown in FIG. 10, the PUSCH transmission power is set to not be changed in the subframe m, and the PUSCH transmission power is set to be changed in a subframe of which a modulation scheme is a phase modulation scheme from among the subframe k and the subframe (k+1).

According to the reference 3 of the third embodiment, when both the modulation scheme of the subframe m and the modulation scheme of the subframe k and the subframe (k+1) correspond to an amplitude modulation scheme, as shown in FIG. 11, the PUSCH transmission power of the subframe m is preferentially allocated and the PUSCH transmission power of the subframe (k+1) is set to be identical to PUSCH transmission power of the subframe k.

Further, in operation S1220, when a third component carrier exists, which is included in an identical TA group of the first component carrier, required power of the first component carrier includes required power of the third component carrier, and the transmission power of the subframe m of the first component carrier may be embodied to be power, scaled at a predetermined ratio which is agreed on with the third component carrier.

Subsequently, the PUSCH transmission power of the subframe m is set based on the calculated power, and uplink transmission to a base station may be executed through the subframe m in operation S1230.

In particular, the uplink transmission indicates transmission through the front half of the subframe m together with the latter half of the subframe k, and transmission through the latter half of the subframe m together with the front half of the subframe (k+1)

Figure 13:
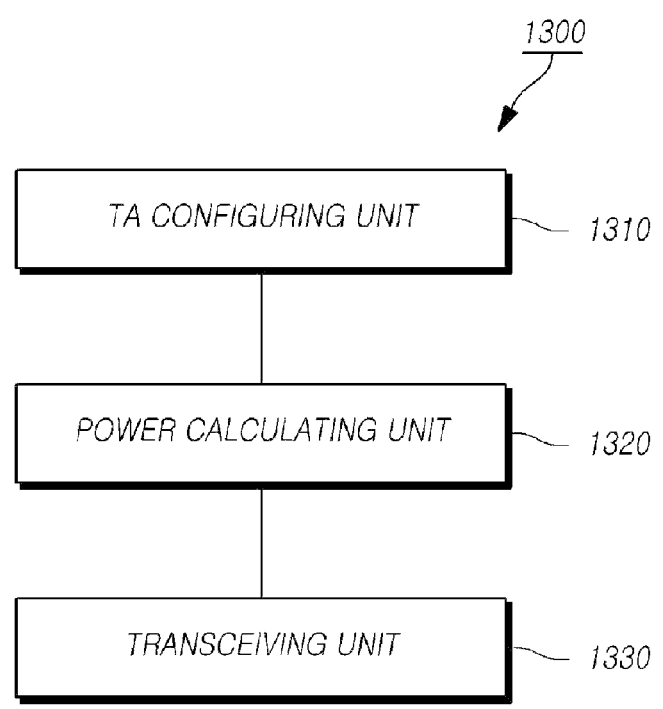
FIG. 13 is a diagram illustrating a configuration for a user equipment to allocate uplink power in a multiple-TA environment, according to an embodiment of the present invention.

FIG. 13 is a diagram illustrating a configuration for a user equipment to allocate uplink power in a multiple-TA environment, according to an embodiment of the present invention. The user equipment of FIG. 13 applies a multiple-TA (Multiple Timing Advanced) in a multiple-component carrier system, including a first component carrier and a second component carrier.

A user equipment 1300 is configured to include a TA configuring unit 1310, a power calculating unit 1320, and a transceiving unit 1330. Although another component element may be included to provide a function of the user equipment 1300, this is not illustrated in the drawing.

The TA configuring unit 1310 configures a TA for each component carrier or a TA for each group.

PUSCH (Physical Uplink Shared Channel) transmission power of a subframe m, a subframe k, and a subframe (k+1) may be calculated, based on required power of a PUSCH of the former half and the latter half of the subframe m of the first component carrier, which respectively overlap, in time, the latter half of the subframe k and the former half of the subframe (k+1) of the second component carrier, PUSCH available power with respect to the component carriers, and PUSCH required power of the latter half of the subframe k and the former half of the subframe (k+1).

The calculation process of the power calculating unit 1320 may be different for each of the embodiments 1, 2, and 3.

According to the first embodiment (please refer to FIGS. 2 and 3), the power calculating unit 1320 calculates power allocable to the front half of the subframe m, by scaling required power of the front half of the subframe m and required power of the latter half of the subframe k, from PUSCH available power during a time corresponding to the former half of the subframe m. The power calculating unit 1320 calculates power allocable to the latter half of the subframe m, by scaling required power of the latter half of the subframe m and required power of the front half of the subframe (k+1), from PUSCH available power during a time corresponding to the latter half of the subframe m. Subsequently, the power calculating unit 1320 allocates, as power of the subframe m, a minimum value among the allocable power, which may be allocable to the front half and the latter half of the subframe m, obtained through scaling.

According to the second embodiment (refer to FIGS. 5 and 6), the power calculating unit 1320 includes the steps 1 through 6 of FIG. 5, and is embodied as follows. The power calculating unit 1320 calculates PUSCSH assumption power for the front half of the subframe m by scaling required power of the front half of the subframe m and required power of the latter half of the subframe k, from PUSCH available power during a time corresponding to the former half of the subframe m. The power calculating unit 1320 calculates PUSCH assumption power of the latter half of the subframe m by scaling required power of the latter half of the subframe m and required power of the front half of the subframe (k+1), from PUSCH available power during a time corresponding to the latter half of the subframe m. Also, in a similar manner, the power calculating unit 1320 calculates PUSCH assumption power of the front half and the latter half of a subframe (m+1), and calculates a minimum value from among the PUSCH assumption power as PUSCH assumption power of the subframe (m+1). Subsequently, the power calculating unit 1320 calculates PUSCH transmission power of the subframe m based on the PUSCH assumption power of the former half and the latter half of the subframe m, PUSCH transmission power of the subframe k, PUSCH assumption power of the subframe (m+1), and PUSCH assumption power of the subframe (k+1).

According to the third embodiment (refer to FIGS. 8, 9, 10, and 11), the power calculating unit 1320 sets the PUSCH transmission power of the subframe m, based on a modulation scheme of the subframe m and a modulation scheme of the subframe k and the subframe (k+1).

In more particular, according to the reference 1 of the third embodiment, when both the modulation scheme of the subframe m and the modulation scheme of the subframe k and the subframe (k+1) correspond to a phase modulation (Phase Shift Keying) scheme, as shown in FIG. 8, the power calculating unit 1320 sets the PUSCH transmission power to be changed in the subframe m.

Also, as shown in FIG. 9, the power calculating unit 1320 sets the PUSCH transmission power to be changed in one of the symbols forming the subframe m.

According to the reference 2 of the third embodiment, when the modulation scheme of the subframe m is an amplitude modulation scheme, and a modulation scheme of at least one of the subframe k and the subframe (k+1) is a phase modulation scheme, as shown in FIG. 10, the power calculating unit 1320 sets the PUSCH transmission power to not be changed in the subframe m, and sets the PUSCH transmission power to be changed in a subframe of which a modulation scheme is a phase modulation scheme from among the subframe k and the subframe (k+1).

According to the reference 3 of the third embodiment, when both a modulation scheme of the subframe m and a modulation scheme of the subframe k and the subframe (k+1) correspond to an amplitude modulation scheme, as shown in FIG. 11, the power calculating unit 1320 preferentially allocates the PUSCH transmission power of the subframe m and sets the PUSCH transmission power of the subframe (k+1) to be identical to PUSCH transmission power of the subframe k.

Further, when a third component carrier exists, which is included in an identical TA group of the first component carrier, required power of the first component carrier includes required power of the third component carrier, and the power calculating unit 1320 embodies transmission power of the subframe m of the first component carrier to be power scaled at a predetermined ratio, which is agreed on with the third component carrier.

Subsequently, the transceiving unit 1330 sets the PUSCH transmission power of the subframe m based on the calculated power, and executes uplink transmission to a base station through the subframe m.

In particular, the uplink transmission, executed by the transceiving unit 1330, indicates transmission through the front half of the subframe m together with the latter half of the subframe k and transmission through the latter half of the subframe m together with the front half of the subframe (k+1).

Although the technical idea of the present invention has been described for illustrative purposes, those skilled in the art will appreciate that various modifications and changes are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A method of allocating uplink power in a multiple-TA (Multiple Timing Advanced) environment, from a perspective of a user equipment that applies a multiple-TA in a multiple-component carrier system including a first component carrier and a second component carrier, the method comprising:
   calculating PUSCH (Physical Uplink Shared Channel) transmission power of a subframe m of the first component carrier, and a subframe k and a subframe (k+1) of the second component carrier, based on required power of a PUSCH of the former half and the latter half of the subframe m, which respectively overlap, in time, the latter half of the subframe k and the former half of the subframe (k+1) of the second component carrier, PUSCH available power with respect to the component carriers, and PUSCH required power of the latter half of the subframe k and the former half of the subframe (k+1); and
   setting the PUSCH transmission power of the subframe m, based on the calculated power, and executing uplink transmission to a base station through the subframe m.

2. The method as claimed in claim 1, wherein calculating the power comprises:
   calculating power allocable to the former half of the subframe m, by scaling required power of the former half of the subframe m and required power of the latter half of the subframe k from PUSCH available power during a time corresponding to the former half of the subframe m;
   calculating power allocable to the latter half of the subframe m, by scaling required power of the latter half of the subframe m and required power of the former half of the subframe (k+1) from PUSCH available power during a time corresponding to the latter half of the subframe m; and
   allocating, as the power of the subframe m, a minimum value from among the power allocable to the former half and the latter half of the subframe m, obtained through scaling.

3. The method as claimed in claim 1, wherein calculating the power comprises:
   calculating PUSCH assumption power of the former half of the subframe m, by scaling required power of the former half of the subframe m and required power of the latter half of the subframe k from PUSCH available power during a time corresponding to the former half of the subframe m;
   calculating PUSCH assumption power of the latter half of the subframe m, by scaling required power of the latter half of the subframe m and required power of the former half of the subframe (k+1) from PUSCH available power during a time corresponding to the latter half of the subframe m; and
   calculating the PUSCH transmission power of the subframe m, based on the PUSCH assumption power of the former half and the latter half of the subframe m, PUSCH transmission power of the subframe k, PUSCH assumption power of the former half and the latter half of a subframe (m+1) of the first component carrier, and PUSCH assumption power of the subframe (k+1).

4. The method as claimed in claim 1, wherein the PUSCH transmission power of the subframe m is set based on a modulation scheme of the subframe m and a modulation scheme of the subframe k and the subframe (k+1).

5. The method as claimed in claim 4, wherein, when both the modulation scheme of the subframe m and the modulation scheme of the subframe k and the subframe (k+1) correspond to a phase modulation (Phase Shift Keying) scheme, the PUSCH transmission power is set to be changed in the subframe m.

6. The method as claimed in claim 5, wherein the PUSCH transmission power is set to be changed in one of the symbols forming the subframe m.

7. The method as claimed in claim 4, wherein, when the modulation scheme of the subframe m is an amplitude modulation scheme, and a modulation scheme of at least one of the subframe k and the subframe (k+1) is a phase modulation scheme, the PUSCH transmission power is set to not be changed in the subframe m, and the PUSCH transmission power is set to be changed in a subframe of which a modulation scheme is the phase modulation scheme from among the subframe k and the subframe (k+1).

8. The method as claimed in claim 4, wherein, when both the modulation scheme of the subframe m and the modulation scheme of the subframe k and the subframe (k+1) correspond to an amplitude modulation scheme, the PUSCH transmission power of the subframe m is allocated with a greater priority than PUSCH transmission power of the subframe k and PUSCH transmission power of the subframe (k+1), and the PUSCH transmission power of the subframe (k+1) is set to be identical to the PUSCH transmission power of the subframe k.

9. The method as claimed in claim 1, wherein, when a third component carrier exists, which is included in an identical TA group of the first component carrier, required power of the first component carrier includes required power of the third component carrier; and the transmission power of the subframe m of the first component carrier is power, scaled at a predetermined ratio that is agreed on with the third component carrier.

10. The method as claimed in claim 1, wherein executing the uplink transmission comprises:

executing transmission through the former half of the subframe m together with the latter half of the subframe k, and executing transmission through the latter half of the subframe m together with the formal half of the subframe (k+1).

11. A user equipment that applies a multiple-TA (Multiple Timing Advanced) in a multiple-component carrier system including a first component carrier and a second component carrier, the user equipment comprising:

a processor to calculate PUSCH (Physical Uplink Shared Channel) transmission power of a subframe m of the first component carrier, and a subframe k and a subframe (k+1) of the second component carrier, based on required power of a PUSCH of the former half and the latter half of the subframe m, which respectively overlap, in time, the latter half of the subframe k and the former half of the subframe (k+1) of the second component carrier, PUSCH available power with respect to the component carriers, and PUSCH required power of the latter half of the subframe k and the former half of the subframe (k+1); and a transceiver to set the PUSCH transmission power of the subframe m, based on the calculated power, and to execute uplink transmission to a base station through the subframe m.

12. The user equipment as claimed in claim 11, wherein the processor executes:

calculating power allocable to the former half of the subframe m by scaling required power of the former half of the subframe m and required power of the latter half of the subframe k from PUSCH available power during a time corresponding to the former half of the subframe m, calculating power allocable to the latter half of the subframe m by scaling required power of the latter half of the subframe m and required power of the former half of the subframe (k+1) from PUSCH available power during a time corresponding to the latter half of the subframe m, and allocating, as the power of the subframe m, a minimum value from among the power allocable to the former half and the latter half of the subframe m, obtained through scaling.

13. The user equipment as claimed in claim 11, wherein the processor executes:

calculating PUSCH assumption power of the former half of the subframe m by scaling required power of the former half of the subframe m and required power of the latter half of the subframe k from PUSCH available power during a time corresponding to the former half of the subframe m, calculating PUSCH assumption power of the latter half of the subframe m by scaling required power of the latter half of the subframe m and required power of the former half of the subframe (k+1) from PUSCH available power during a time corresponding to the latter half of the subframe m, and calculating the PUSCH transmission power of the subframe m, based on the PUSCH assumption power of the former half and the latter half of the subframe m, PUSCH transmission power of the subframe k, PUSCH assumption power of the former half and the latter half of a subframe (m+1) of the first component carrier, and PUSCH assumption power of the subframe (k+1).

14. The user equipment as claimed in claim 11, wherein the processor sets the PUSCH transmission power of the subframe m, based on a modulation scheme of the subframe m and a modulation scheme of the subframe k and the subframe (k+1).

15. The user equipment as claimed in claim 14, wherein, when both the modulation scheme of the subframe m and the modulation scheme of the subframe k and the subframe (k+1) correspond to a phase modulation (Phase Shift Keying) scheme, the processor sets the PUSCH transmission power to be changed in the subframe m.

16. The user equipment as claimed in claim 15, wherein the processor sets the PUSCH transmission power to be changed in one of the symbols forming the subframe m.

17. The user equipment as claimed in claim 14, wherein, when the modulation scheme of the subframe m is an amplitude modulation scheme, and a modulation scheme of at least one of the subframe k and the subframe (k+1) is a phase modulation scheme, the processor sets the PUSCH transmission power to not be changed in the subframe m, and sets the PUSCH transmission power to be changed in a subframe of which a modulation scheme is the phase modulation scheme from among the subframe k and the subframe (k+1).

18. The user equipment as claimed in claim 14, wherein, when both the modulation scheme of the subframe m and the modulation scheme of the subframe k and the subframe (k+1) correspond to an amplitude modulation scheme, the processor allocates the PUSCH transmission power of the subframe m with a greater priority than PUSCH transmission power of the subframe k and PUSCH transmission power of the subframe (k+1), and sets the PUSCH transmission power of the subframe (k+1) to be identical to the PUSCH transmission power of the subframe k.

19. The user equipment as claimed in claim 11, wherein, when a third component carrier exists, which is included in an identical TA group of the first component carrier, the processor calculates the transmission power of the subframe m of the first component carrier since required power of the first component carrier includes the required power of the third component carrier; and the processor calculates the transmission power of the subframe m of the first component carrier as power, scaled at a predetermined ratio that is agreed on with the third component carrier.

20. The user equipment as claimed in claim 11, wherein the transceiver executes transmission through the former half of the subframe m together with the latter half of the subframe k, and executes transmission through the latter half of the subframe m together with the formal half of the subframe (k+1).

* * * * *